United States Patent
Ellinghuysen

(10) Patent No.: US 10,542,742 B1
(45) Date of Patent: Jan. 28, 2020

(54) PORTABLE GAME BLIND

(71) Applicant: Mark Ellinghuysen, Winona, MN (US)

(72) Inventor: Mark Ellinghuysen, Winona, MN (US)

( * ) Notice: Subject to any disclaimer, the term of this patent is extended or adjusted under 35 U.S.C. 154(b) by 0 days.

(21) Appl. No.: 16/036,633

(22) Filed: Jul. 16, 2018

(51) Int. Cl.
*A01M 31/02* (2006.01)
*E04H 15/34* (2006.01)
*E04H 15/00* (2006.01)

(52) U.S. Cl.
CPC ......... *A01M 31/025* (2013.01); *E04H 15/001* (2013.01); *E04H 15/34* (2013.01)

(58) Field of Classification Search
CPC ..... A01M 31/025; A01M 31/01; E04H 15/34; E04H 15/001
USPC .............................................................. 43/1
See application file for complete search history.

(56) References Cited

U.S. PATENT DOCUMENTS

| | | | | |
|---|---|---|---|---|
| 3,289,787 A * | 12/1966 | McSwain | ............. | E04H 15/001 182/20 |
| 3,509,891 A * | 5/1970 | Bolt | .............. | A01K 97/01 135/148 |
| 3,609,905 A * | 10/1971 | Fuhrman et al. | ..... | A01M 31/00 135/901 |
| 4,274,508 A * | 6/1981 | Hughes | ................. | E06C 7/16 135/100 |
| 4,683,672 A * | 8/1987 | Davis | .................. | A01M 31/025 135/901 |
| 4,696,374 A * | 9/1987 | Hale | ..................... | A01M 31/02 182/127 |
| 4,782,616 A * | 11/1988 | Hambleton | ......... | A01M 31/025 43/1 |
| 5,173,563 A * | 12/1992 | Gray | ....................... | F41A 23/02 42/94 |
| 5,241,772 A * | 9/1993 | Hall | ....................... | A01M 31/00 135/117 |
| 5,762,085 A * | 6/1998 | Punch | ................... | E04H 15/001 135/115 |
| 6,021,794 A * | 2/2000 | Guerra | ................. | E04H 15/001 135/121 |
| 6,202,665 B1 * | 3/2001 | O'Hare | ............... | A01M 31/025 135/90 |
| 7,575,241 B1 * | 8/2009 | Keller | ................. | A01M 31/025 135/901 |
| 7,658,140 B2 * | 2/2010 | Lombardi | ........... | A01M 31/025 42/94 |

(Continued)

FOREIGN PATENT DOCUMENTS

| | | | | |
|---|---|---|---|---|
| CA | 2432987 A1 * | 12/2003 | ............. | A01K 97/01 |
| DE | 102016116045 B4 * | 5/2018 | | |
| WO | WO-2011157707 A1 * | 12/2011 | ............... | A47C 7/72 |

*Primary Examiner* — Magdalena Topolski
(74) *Attorney, Agent, or Firm* — Foley & Lardner LLP

(57) ABSTRACT

A game blind includes a frame having a central opening sized to accommodate a user, a plurality of support members coupled to the frame, and a blind element secured to one of the mounting points. The frame is suspended above a ground surface by the plurality of support members, which allow a user to level the frame relative to the ground surface by adjusting the position of the support members relative to the frame. The game blind may be configured in an in-use position when hunting or observing wild game, or a collapsed position when transporting or storing the game blind. In the collapsed position, the blind element may interface with at least one of the support members, which secures the blind element to the frame.

15 Claims, 24 Drawing Sheets

(56) References Cited

U.S. PATENT DOCUMENTS

| | | | | |
|---|---|---|---|---|
| 9,033,105 | B1* | 5/2015 | Boswell | A01M 31/025 182/115 |
| 9,072,290 | B1* | 7/2015 | McCauley | A01M 31/025 |
| 9,259,094 | B1* | 2/2016 | McCauley | A47C 17/64 |
| 10,412,954 | B1* | 9/2019 | Ellinghuysen | F41A 23/18 |
| 2003/0034061 | A1* | 2/2003 | Warner | E04H 15/18 135/144 |
| 2003/0034205 | A1* | 2/2003 | Spencer | E06C 1/397 182/63.1 |
| 2009/0236179 | A1* | 9/2009 | Lopez | A01M 31/02 182/63.1 |
| 2010/0223832 | A1* | 9/2010 | Lombardi | A01M 31/025 42/94 |
| 2010/0288584 | A1* | 11/2010 | Zinsmeyer | A01M 31/02 182/129 |
| 2012/0085381 | A1* | 4/2012 | Anders, III | E04H 15/001 135/143 |
| 2013/0036681 | A1* | 2/2013 | Baird, III | A01M 31/025 52/143 |
| 2013/0118540 | A1* | 5/2013 | Hayes | E04H 15/001 135/96 |
| 2016/0021869 | A1* | 1/2016 | George | A47C 9/10 135/96 |
| 2016/0200342 | A1* | 7/2016 | Triscari | B62B 13/16 280/19.1 |
| 2016/0244990 | A1* | 8/2016 | Clendaniel | E04H 15/44 |
| 2016/0374329 | A1* | 12/2016 | Garrett | A01M 31/02 182/115 |
| 2018/0014529 | A1* | 1/2018 | Litwin | A01M 31/002 |
| 2018/0064096 | A1* | 3/2018 | Kruska | F16M 13/00 |
| 2019/0045930 | A1* | 2/2019 | Denmon | A47C 3/18 |

* cited by examiner

PORTABLE GAME BLIND

TECHNOLOGY

The present technology relates generally to the field of game blinds. More specifically, it is related to a portable game blind having a variety of different configurations and operating modes.

SUMMARY

In one aspect, a game blind includes a frame having an upper surface and a plurality of mounting points disposed proximate to a perimeter of the frame, a user opening disposed centrally in the upper surface, a plurality of support members coupled proximate to the perimeter of the frame and at least one blind element. The frame is disposed circumferentially around a user and conceals the user from wild game. The height of each support member relative to the frame may be adjusted to level the frame relative to a ground surface.

In any of the above embodiments, a support member forward of the user may be angled away from the user to provide increased clearance when aiming and firing a bow or other weapon. In any of the above embodiments, the game blind is reconfigurable between an in-use position utilized for hunting and observing game, and a collapsed position utilized when storing or transporting the game blind. In the collapsed position, the support members may be repositioned to reduce the physical footprint of the game blind.

In any of the above embodiments, the game blind may include at least one of a helper rail, a seat assembly, and an accessory support system.

In any of the above embodiments, one or more of the blind element, helper rail, seat assembly, and accessory support system may include a locking member configured to interface with one of the support members. The locking member may be configured to prevent movement of any of the blind element, helper rail, and accessory support system relative to the frame in a collapsed position.

In an embodiment, a blind element includes a blind panel that further incorporates one of a reflective material and an adhesive material.

An embodiment includes a method of assembly for the game blind that includes repositioning the support members to level a surface of the frame. The method may further include reconfiguring multiple support members from a collapsed position, where each one of the support members is substantially parallel to the surface, to an in-use position, where the each one of the support members is substantially perpendicular to the surface.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Figure 1:
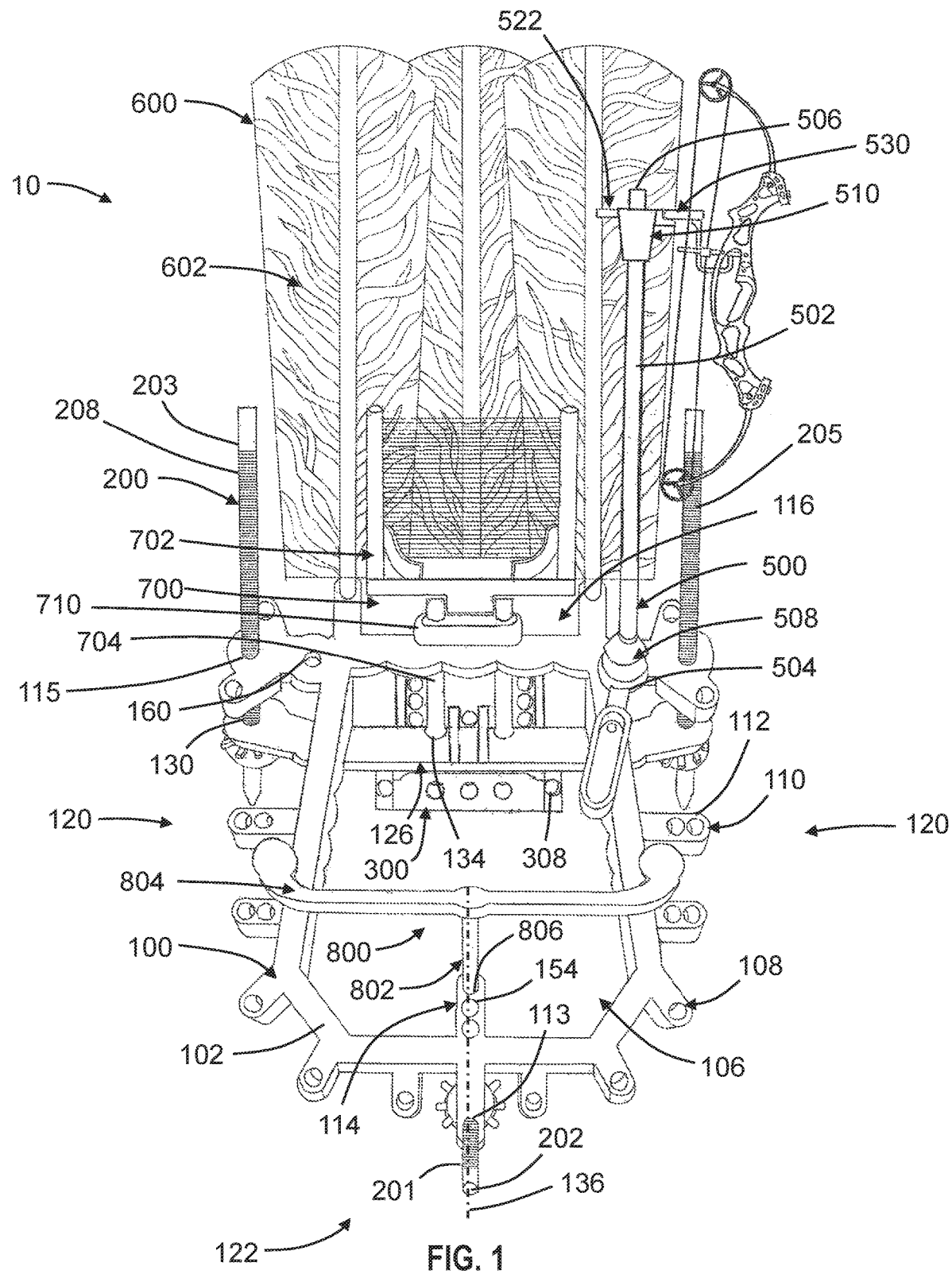
FIG. 1 is a prospective view of a game blind, in an in-use position, according to an illustrative embodiment.

In general, disclosed herein are systems and apparatuses that are used for concealment or utility, for example, when hunting or photographing game. The systems and apparatuses have been developed for portability, to provide ready access to the tools and equipment that a hunter or observer may use or need in the field, and for added concealment of the hunter or observer from her quarry. As a brief overview of the more detailed description to follow, and referring generally to FIG. 1, a portable game blind 10 is provided, according to an illustrative embodiment. The portable game blind 10 is adapted for standalone use on any ground surface. The portable game blind 10 is configured to be installed on almost any ground surface, including sloped surfaces and highly uneven terrain. As shown in FIG. 1, the portable game blind 10 is supported by three support posts whose height may be adjusted to maintain the portable game blind 10 in a level position. The portable game blind 10 includes a frame that is suspended above the ground surface by the support posts. The frame surrounds a user on all sides and is used to support blind elements and other user accessories. The user may rest comfortably, in a level position, on seat mounted to the frame while observing or hunting game.

As shown in FIG. 1, the portable game blind 10 is configured to support a variety of different elements around the user. For example, the portable game blind 10 may include blind elements, supports for mounting various accessories to the portable game blind 10, and a helper rail to provide a resting place for the user or a device support. Advantageously, the user may reconfigure the portable game blind 10 to suit her needs in the field. For example, the number, type, and position of blind elements may be modified. Additionally, the position of the helper rail and accessories relative to the user may be adjusted.

A sufficient number of accessory mounting points are provided in the portable game blind 10 to allow the user the option of storing some of the unused components and accessories in a safe position while in the field. The number of potential configurations of the portable game blind 10 is practically limitless.

When not in use, the portable game blind 10 may be collapsed into a more compact form, from which a single user may transport the system to and from any remote location. Importantly, the system is self-locking when collapsed; a configuration that ensures the various components and accessories remain coupled together while transporting the device. The details of the general depictions provided in FIG. 1 will be more fully explained by reference to FIGS. 1-24.

Referring now to FIG. 1, a game blind 10, shown as portable game blind 10, is provided according to an illustrative embodiment. In an embodiment, the portable game blind 10 is a hunting blind used to conceal a hunter from the sharp eyes of game animals such as deer, turkey, bear, coyote, geese, or other animals. In other embodiments, the portable game blind 10 is a photography blind used to view wild animals in their natural environment. As shown in FIG. 1, the portable game blind 10 includes a frame 100, a base plate, shown as storage plate 300, affixed to the frame 100, and a plurality of support members 200. The portable game blind 10 also includes an accessory support system 500, blind elements 600, a seat assembly 700, and a helper rail 800.

Figure 2:
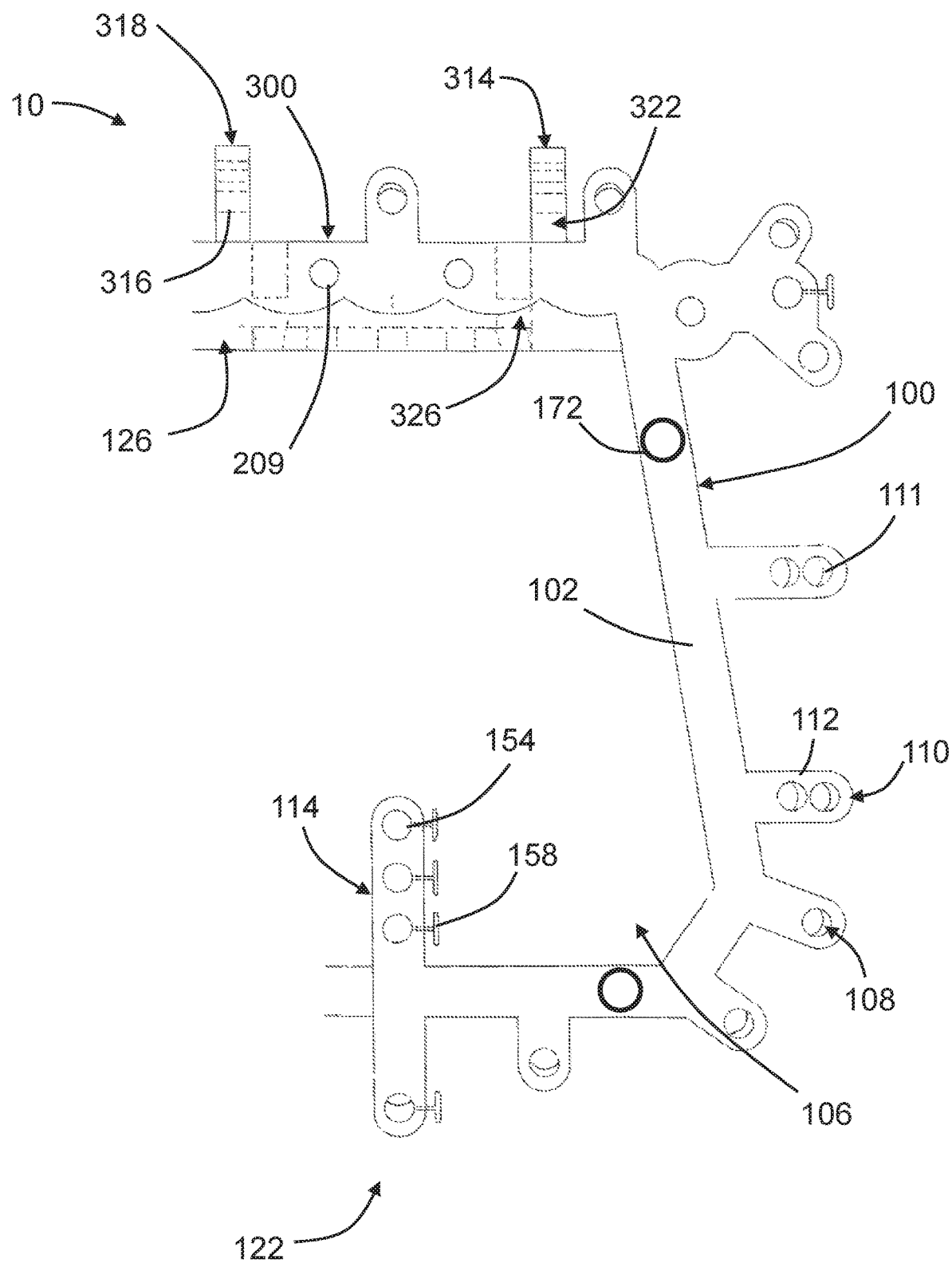
FIG. 2 is a top view of a frame for the game blind of FIG. 1, according to an illustrative embodiment.

In the embodiment of FIG. 1, the portable game blind 10 is configured for use on almost any ground surface. The frame 100 is supported above a ground surface by a plurality of support members 200. As shown in FIGS. 1 and 2, the frame 100 includes an upper surface 102 and a plurality of mounting points 108 disposed proximate to a perimeter of the frame 100. An opening, shown as user opening 106, is disposed centrally in the upper surface 102. The opening 106 is sized to accommodate the entire body of a user such that the user may fit within the opening 106 comfortably. In other embodiments, the opening 106 is sized to accommodate a user's feet, such that the user's feet rest upon the ground surface below the game blind 10, while the remainder of the user's body is positioned above the upper surface 102 of the frame 100. In other embodiments, the opening may be larger than a user's body.

As shown in FIGS. 1 and 2, the frame 100 includes a plurality of mounting points 108 disposed proximate to a perimeter of the frame 100. The mounting points 108 may be configured to accommodate a variety of components. For example, each of the plurality of mounting points 108 may be configured to accommodate at least one of the following components: the accessory support system 500, the blind elements 600, the seat assembly 700, and the helper rail 800. In the embodiment of FIGS. 1 and 2, the mounting points 108 take the form of a plurality of holes that extend through the upper surface 102. Some of the mounting points 108 are disposed along the perimeter of the frame 100, while other mounting points 108 are disposed on a series of small extension legs 110 that are coupled to the frame 100. Each of the extension legs 110 extends a small distance outward from the perimeter of the frame 100 and away from the opening 106. A top surface 112 of each of the extension legs 110 is approximately flush with the upper surface 102 of the frame 100. In the embodiment of FIGS. 1 and 2, one of the extension legs 110, shown as helper rail leg 114, extends from the perimeter of the frame 100, at a central position on a front portion 122 of the frame 100, toward the opening 106 such that it occupies a small fraction of the opening 106. In other embodiments, the arrangement of extension legs 110 may be different.

Figure 3:
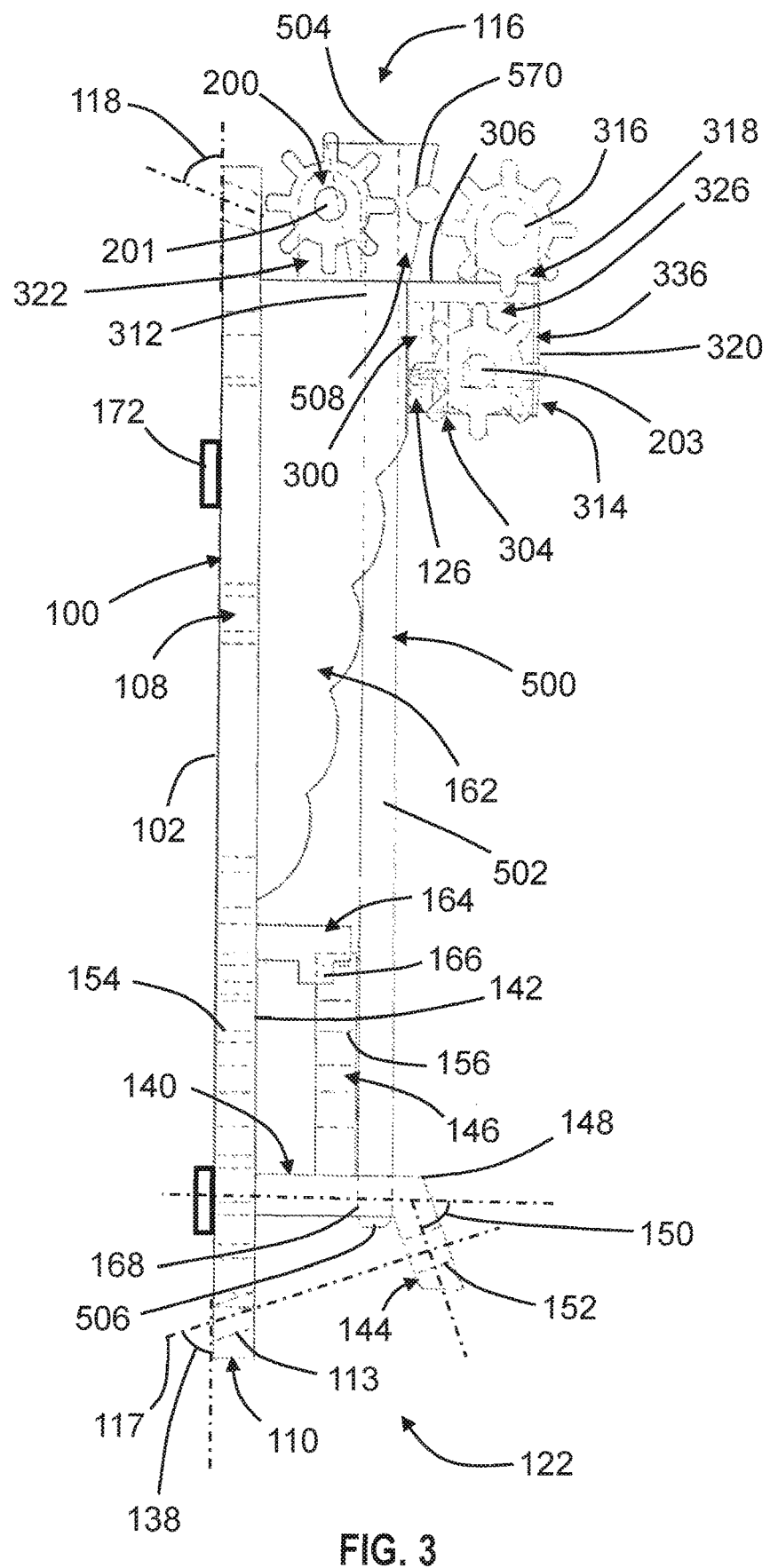
FIG. 3 is a side view of the game blind of FIG. 1, showing the game blind in a collapsed position.

More than one mounting point 108 may be disposed on a single extension leg 110. In the embodiment of FIGS. 1 and 2, several of the extension legs 110 include two or more mounting points 108 arranged along the length of the extension legs 110. Among other benefits, this arrangement of mounting points 108 provides a user with multiple options for positioning of the blind elements 600 and other accessories with respect to the frame 100. As shown in FIG. 3, the extension legs 110 proximate to the rear portion 116 of the frame 100 include mounting points 108 (e.g., holes 109 in FIG. 2) oriented at an angle, shown as rear angle 118 of between 70°-65° relative to the upper surface 102 (angled outward from the opening 106). The remaining extension legs 110 (e.g., proximate to side portions 120 of the frame 100 and front portion 122 of the frame 100, but not including the mounting point 108 disposed on an extension leg 110 proximate to the center of the front portion 122) include holes 111 (see FIG. 2) oriented at an angle of approximately 60°, relative to the upper surface 102 of the frame 100 (angled outward from the opening 106). In other embodiments the angles may be different.

In various alternative embodiments, the mounting points 108 take the form of threaded holes configured to receive a threaded rod. In other embodiments, the mounting points 108 include an engagement mechanism (e.g., a tab, clip, or other engagement feature configured to secure an accessory component to the frame 100).

Figure 4:
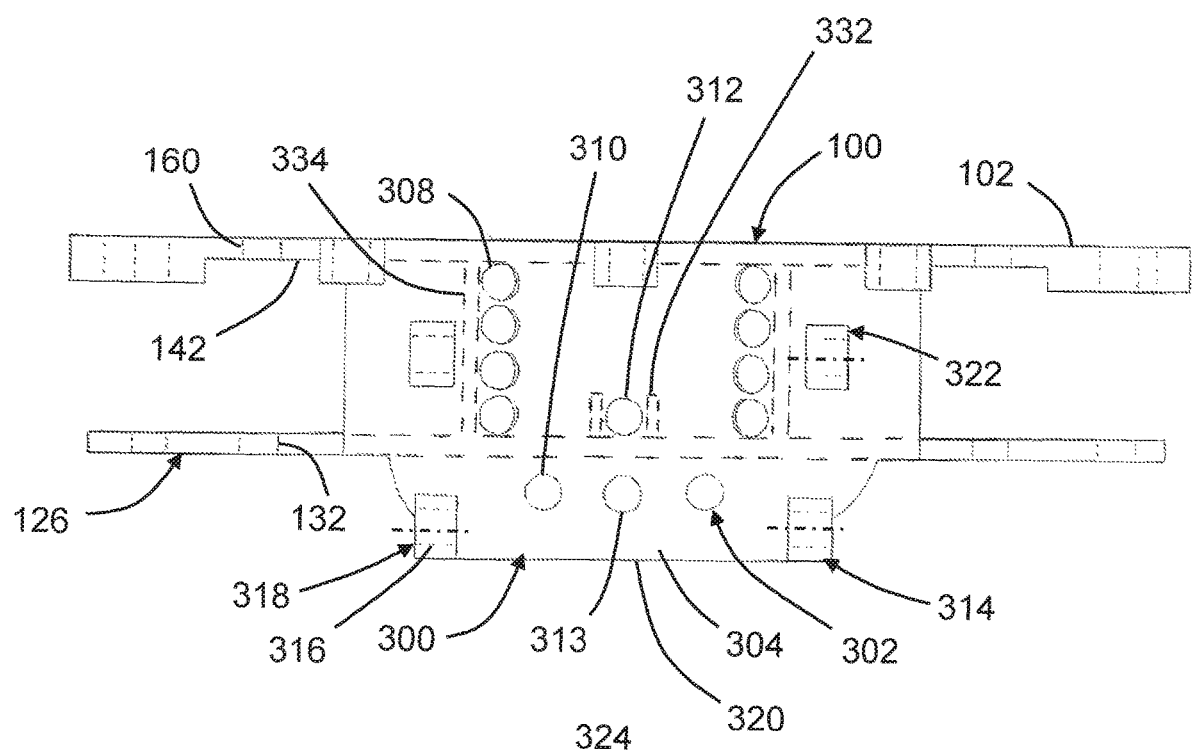
FIG. 4 is a rear view of the frame of the game blind of FIG. 1.

According to the illustrative embodiment of FIG. 4, and in reference generally to FIGS. 1-3, the portable game blind 10 further includes a base plate, shown as storage plate 300, affixed to the frame 100 (e.g., fastened to the frame using bolts, screws, clips, or any other suitable fastener). The storage plate 300 is configured to retain the various assembly components during transport and storage operations. The storage plate 300 is disposed centrally on the rear portion 116 of the frame 100. As shown in FIG. 4, the storage plate 300 includes a plurality of connection points, shown as mounting holes 302 that pass through the storage plate 300 from a front surface 304 of the storage plate 300 to a rear surface 306 of the storage plate 300.

In the embodiment of FIG. 4, the mounting holes 302 include ten blind element storage holes 308, a pair of seat assembly storage holes 310, an accessory support storage hole 312, and a helper rail storage hole 313. The accessory support storage hole 312 is disposed centrally on the storage plate 300 (e.g., centrally on the front surface 304 of the storage plate 300). Eight of the ten blind element storage holes 308 are disposed in groups of four on both sides of the accessory support storage hole 312, between the accessory support storage hole 312 and a left and right edge of the storage plate 300. The remaining two blind element storage holes 308 (see FIG. 1) are disposed proximate to the outside edge of the storage plate 300 (e.g., in-line with the helper rail storage hole 313). The number and position of blind element storage holes 308 may be different depending on how many blind elements are used. The lower most hole in each group of four blind element storage holes 308 is laterally aligned (e.g. aligned left to right) with the accessory support storage hole 312. The remaining blind element storage holes 308 are spaced evenly and extend in a line toward the upper surface 102 of the frame 100. The seat assembly storage holes 310 are disposed below the accessory support storage hole 312, between the accessory support storage hole 312 and a bottom edge of the storage plate 300. The seat assembly storage holes 310 are arranged along a lateral direction (e.g., left to right). Finally, the helper rail storage hole 313 is disposed in between the seat assembly storage holes 310.

As shown in FIGS. 2-4, the storage plate 300 also includes a plurality of extension pieces 314, each of the extension pieces 314 configured to receive a corresponding one of the support members 200 (shown in FIG. 1). In the embodiment of FIGS. 2-4, each extension piece 314 includes an attachment point, shown as through-hole 316 oriented in a direction that is substantially parallel to the upper surface 102 and at least one of a front surface 304 and a rear surface 306 (see FIG. 3) of the storage plate 300. A first set of the extension pieces 314, shown as first pair 318, is disposed on the rear surface 306 of the storage plate 300 proximate to a lower edge 320 of the storage plate 300, a second set of the extension pieces 314, shown as second pair 322, is disposed on the rear surface 306 of the storage plate 300 between the lower edge 320 of the storage plate 300 and an upper edge 324 (see FIG. 4) of the storage plate 300, and a third set of the extension pieces 314, shown as third pair 326 is disposed on a front surface 304 of the storage plate 300 proximate to the lower edge 320 of the storage plate 300.

Figure 5:
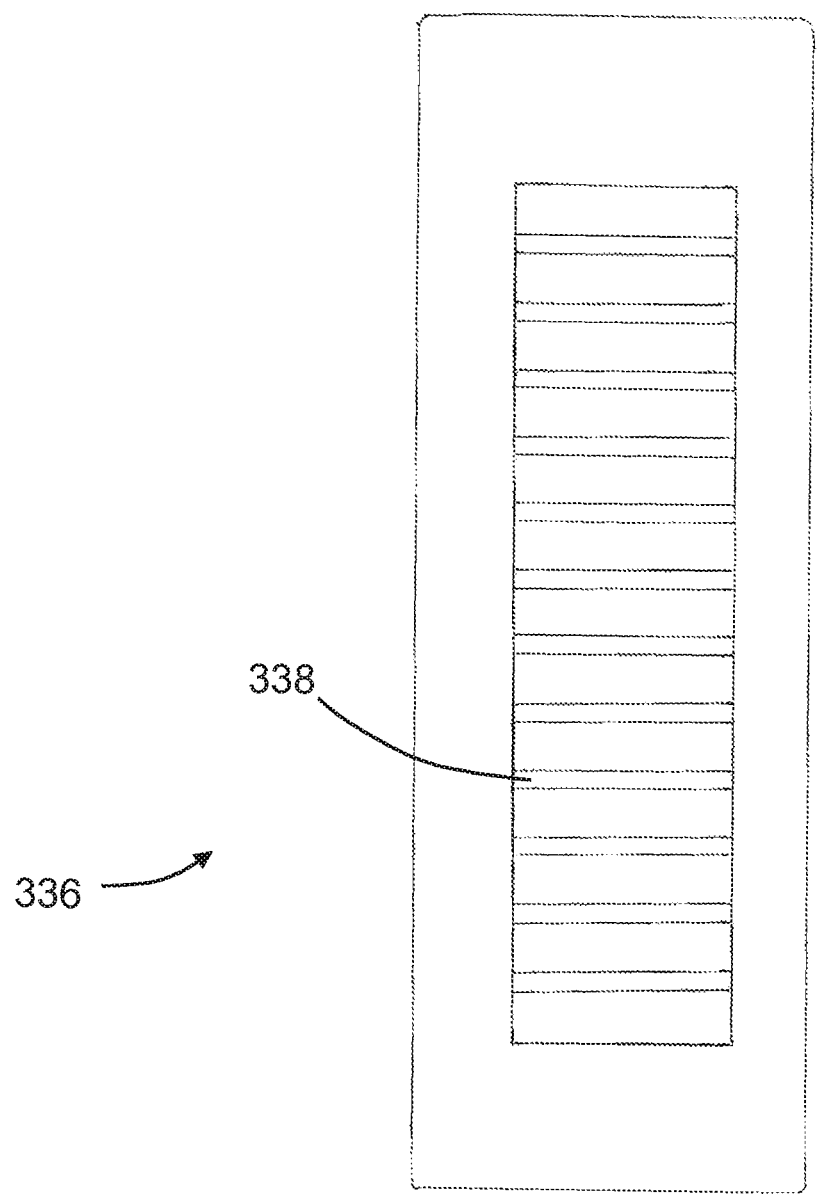
FIG. 5 is a bottom view of a protecting plate for the portable blind of FIG. 1, according to an illustrative embodiment.

As shown in FIG. 5, an opening formed between the third pair 326 of extension pieces 314 is at least partially blocked off by a protecting plate, shown as plate 336. The plate 336 is configured to prevent objects from becoming lodged in the opening or interfering with one of the support members 200 (shown in FIG. 1) during assembly or disassembly operations. In the embodiment of FIG. 5, the plate 336 is a rectangular piece of material that is affixed to the storage plate 300 proximate to the lower edge 320 (see FIG. 3). The plate 336 includes a plurality of slots 338, which serve to reduce the weight of the game blind 10 and provide a means to remove trapped water, dirt, and debris.

A support member 200 is configured to be received within holes through each of the first pair 318, the second pair 322, and the third pair 326 of extension pieces 314. As shown in FIGS. 3-4, a hole through the first extension piece of each pair 318, 322, 326 is approximately coaxial with a hole through a second extension piece of each pair 318, 322, 326. In various embodiments, each set of extension pieces may include more or fewer extension pieces 314. Furthermore, the arrangement of extension pieces 314 on the storage plate 300 may be adjusted depending on the number of support members 200 and the design of the support members 200. In various embodiments, the second extension piece of each pair 318, 322, 326 includes a locking tab, clip, or set screw configured to retain the support member 200 (i.e., to prevent the support member 200 from separating from the frame 100) when transporting the game blind 10. In other embodiments, the attachment points are flexible holders (e.g., steel or plastic C-clip, etc.) configured to retain one of the support members 200 in a fixed position relative to the frame 100.

Figure 6:
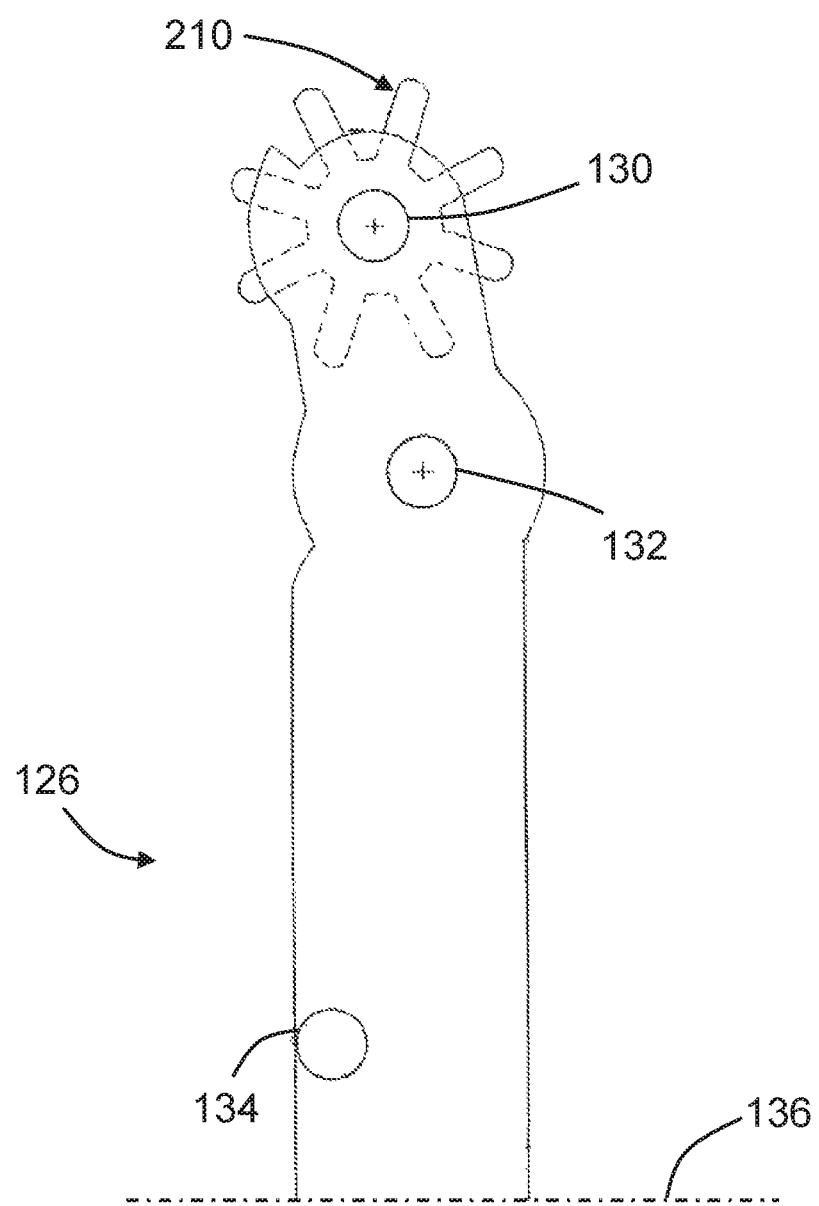
FIG. 6 is a top view of a lower rail of the game blind of FIG. 1, according to an illustrative embodiment.

As shown in FIGS. 1 and 4, the frame 100 for the game blind 10 further includes a lower rail 126 affixed (e.g., using bolts, screws, clips, or another suitable fastener) to one of the storage plate 300 and the frame 100. In the embodiments of FIGS. 1 and 4, the lower rail 126 is made from a single piece of lightweight material (e.g., plastic, aluminum, etc.). The lower rail 126 is disposed proximate to the storage plate 300 and extends along the front surface 304 of the storage plate 300 and just beyond the side portions 120 of the frame 100. FIG. 6 generally shows a top view of a first half of the lower rail 126, according to an illustrative embodiment. A second half of the lower rail 126 (not shown), is a mirror image of the first half. The lower rail 126 includes end connections, shown as end holes 130, mid-connections, shown as accessory support holes 132, and central connections, shown as seat assembly holes 134. Each of the end holes 130, seat assembly holes 134, and accessory support holes 132 are oriented in a direction that is substantially perpendicular to the upper surface 102 of the frame 100 (see FIG. 1). Each of the end holes 130 are disposed proximate to an end of the lower rail 126. The seat assembly holes 134 are disposed proximate to a reference line, shown as central axis 136, which extends from the front portion 122 toward a rear portion 116 of the frame 100. The accessory support holes 132 are disposed between the end holes 130 and the seat assembly holes 134.

As shown in FIG. 3, the frame 100 includes a lower support 140 configured to provide additional structural supporting to at least one of the support members 200 and the helper rail 800 (shown in FIG. 1). The lower support 140 is disposed on a bottom surface 142 of the frame 100. More specifically, the lower support 140 is disposed on the front portion 122 of the frame 100 along the central axis 136 (see FIG. 1) and extends downward from the frame 100. The lower support 140 includes a forward extension 144 and an aft extension 146. The forward extension 144 is disposed on a bottom end 148 of the lower support 140 and extends away from the lower support 140, along the central axis 136, and away from the opening 106 (see FIG. 1). In the embodiment of FIG. 3, the forward extension 144 is angled away from the bottom surface 142 of the frame 100 (e.g., toward the ground surface). In alternative embodiments, the forward extension 144 may be substantially parallel with the upper surface 102 or the bottom surface 142 of the frame 100, or at any angle that provides suitable clearance between components. As shown in FIG. 3, the forward extension 144 forms an angle 150 of approximately 70° with the lower support 140. In alternative embodiments, any other suitable angle may be utilized.

The aft extension 146 is disposed approximately mid-way between the bottom surface 142 of the frame 100 and the forward extension 144. The aft extension 146 extends away from the lower support 140 in a direction that is substantially perpendicular to the lower support 140 (e.g., substantially parallel to the bottom surface 142 of the frame 100). As shown in FIG. 3, the aft extension 146 extends along the central axis 136 (see FIG. 1) towards the opening 106 of the frame 100.

As shown in FIG. 3, the frame 100 may also include a pair of side covers 162 that extend between the front surface 304 of the storage plate 300 and the bottom surface 142 of the frame 100. The frame 100 may also include at least one locating member 164 that extends downward from the bottom surface 142 (e.g., toward a ground surface) and is oriented perpendicular the bottom surface 142. The locating member(s) 164 are configured to secure the helper rail 800 (see FIG. 1) in position relative to the frame 100 when the game blind 10 is configured in a collapsed position as will be further described. Specifically, the locating member(s) 164 includes a stud 166 configured to interface with the helper rail 800. In the embodiment of FIG. 3, the stud 166 is cylindrical with identical cross-sections normal to the axis of the stud 166. Alternatively, the locating member(s) 164 may be conical or tapered. Alternatively, the stud 166 may be replaced by another retaining feature (e.g., snap clip, etc.).

In the embodiment of FIG. 3, the frame also includes a plurality of pads 172 configured to support the game blind 10 in a collapsed position. The pads 172 are disposed on the upper surface 102 of the frame 100. The pads 172 may be made from rubber, plastic, or any other suitable material. In other embodiments, the position and arrangement of the pads 172 may be different.

Figure 7:
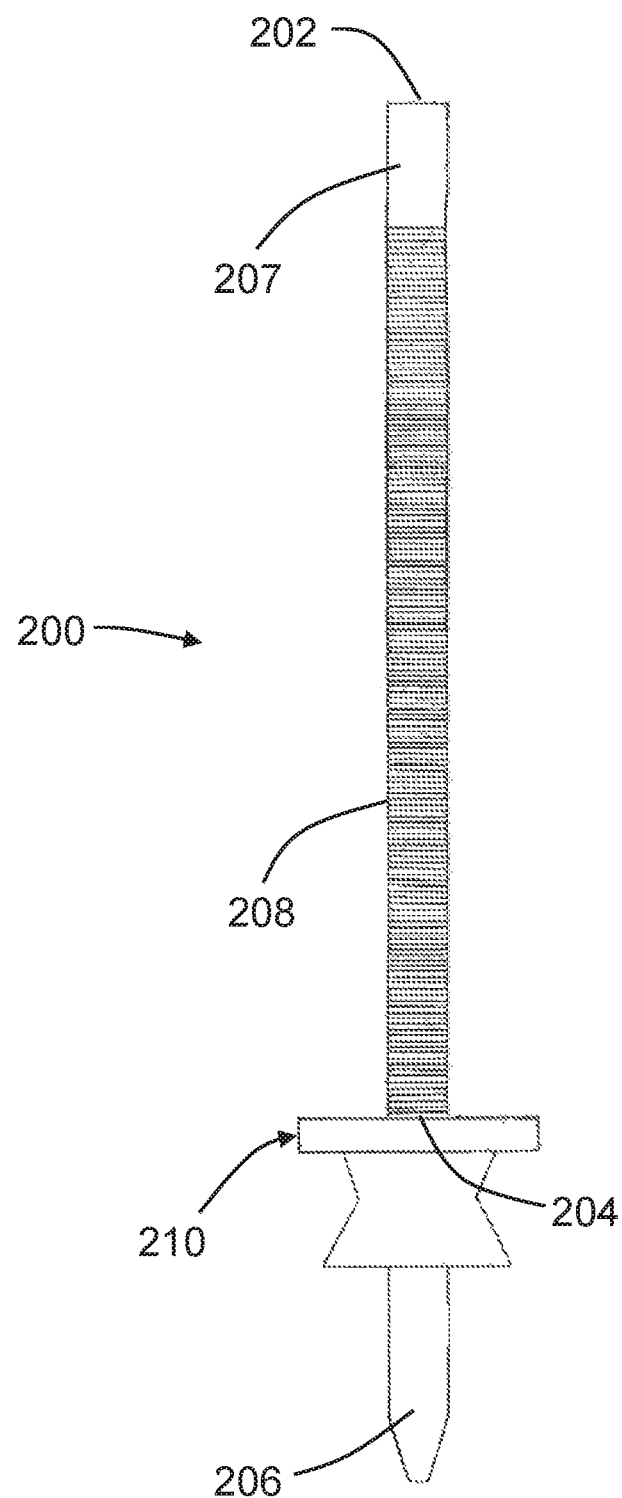
FIG. 7 is a first side view of a support member for the game blind of FIG. 1, according to an illustrative embodiment.
Figure 8:
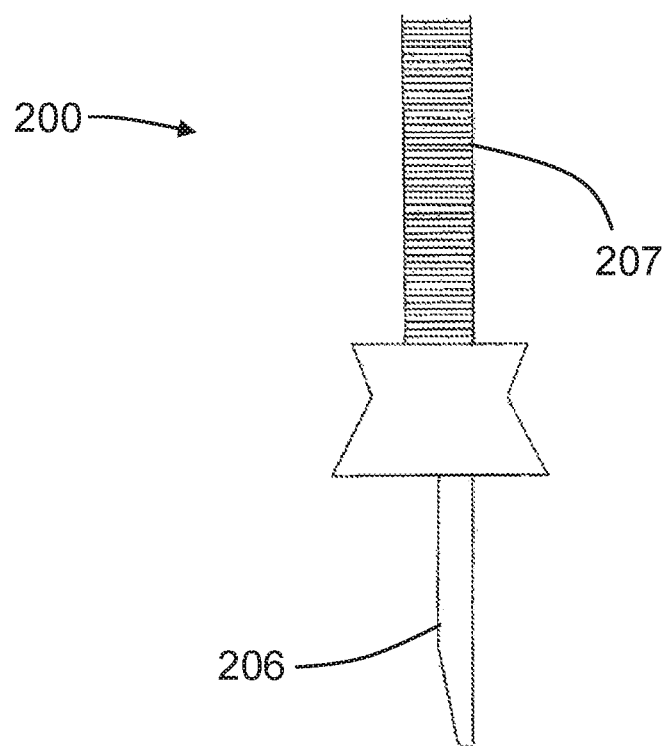
FIG. 8 is a second side view of the support member for the game blind of FIG. 1.

According to an illustrative embodiment, the frame 100 of the game blind 10 is configured to be suspended above a ground surface by the plurality of support members 200. The embodiment of FIG. 1 includes three support members 200, each one of the support members 200 coupled to the frame 100 proximate to the perimeter of the frame 100. A first support member 201 is disposed proximate to the front portion 122 of the frame 100 along the central axis 136. Each of a second support member 203 and a third support member 205 are disposed proximate to a rear portion 116 of the frame 100 at a rear corner of the frame 100. An illustrative embodiment of the support member 200 is shown in FIG. 7. The support member 200 includes a shaft 207 (e.g., a cylindrical rod, post, etc.) having an upper end 202 and a lower end 204 opposite the upper end 202. The lower end 204 is configured to contact a ground surface. The support member 200 includes a ground interface member 206 coupled to the lower end 204 (e.g., the ground interface member 206 is screwed, bolted, or otherwise fastened to the lower end 204). A length of the ground interface member 206 is configured to penetrate the ground surface to prevent lateral movement of the game blind 10 (see FIG. 1). In the embodiment of FIGS. 7-8, the ground interface member 206 takes the form of a spike with a tapered end. The spike is formed from a single piece of sheet metal (e.g., stainless steel, aluminum, etc.) in an elongated V-shape. In various alternative embodiments, the ground interface member is a rod with a sharpened end, or any other feature that suitably couples the game blind 10 to the ground surface.

In the embodiment of FIG. 1, the first support member 201 is coupled to the frame 100 via the mounting point 108, shown as hole 113, disposed on the extension leg 110 located centrally along the front portion 122 of the frame 100 (e.g., disposed along the central axis 136 of the frame 100). As shown in FIG. 3, the first support member 201 (see FIG. 1) is configured to be received within hole 113 and a corresponding support hole, shown as forward support hole 152, disposed in the forward extension 144. As shown in FIG. 3, an axis 117 of hole 113 and forward support hole 152 is oriented at an angle 138 relative to the upper surface 102 of the frame 100 such that, once inserted into the hole 113, the upper end 202 of the first support member 201 is positioned farther from the opening 106 on the frame 100 than the lower end 204. In the embodiment of FIG. 3, the axis 117 is oriented at an angle 138 of 70° relative to the upper surface 102. As shown in FIG. 1, among other benefits, angling the first support member 201 away from the opening 106 provides greater forward clearance for a hunter to position and fire a weapon (e.g., bow, gun, etc.) without contacting the upper end 202 of the first support member 201.

Returning now to FIG. 1, each of the second and third support members 203, 205 is coupled to one of two mounting points 108, shown as holes 115, proximate to a rear corner of the frame 100. Each of the second and third support members 203, 205 is received within one of the holes 115 and a corresponding one of the end holes 130 in the lower rail 126. As shown in FIG. 1, each of the holes 115 is coaxial with a corresponding one of the end holes 130, such that each of the second and third support members 203, 205 is oriented in a direction that is substantially perpendicular to the upper surface 102 of the frame 100.

Figure 9:
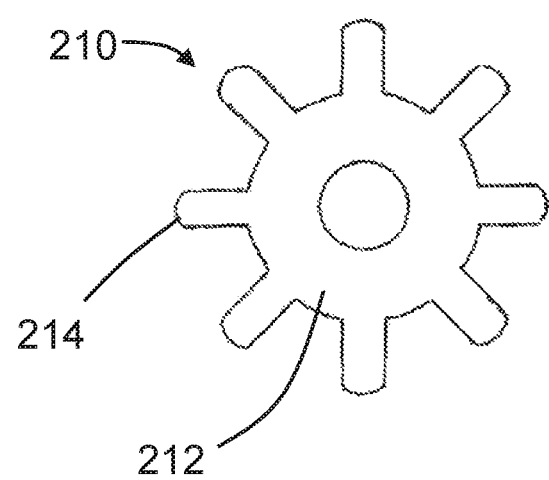
FIG. 9 is a top view of an adjustment nut for the support member of the game blind of FIG. 1, according to an illustrative embodiment.

According to an illustrative embodiment, each one of the plurality of support members 200 is height adjustable. As shown in the embodiment of FIG. 7, each of the support members 200 includes an adjustment portion, shown as threaded portion 208 disposed between the upper end 202 of the support member 200 and the lower end 204 of the support member 200. A threaded adjustment nut 210 is disposed on the threaded portion 208 of the support member 200. As shown in FIG. 9, and in reference to FIG. 4 for certain components, the adjustment nut 210 includes a contact surface 212 configured to interface with one of the bottom surface 142 of the frame 100, the lower rail 126, and the forward extension 144 such that, upon rotation of the adjustment nut 210, the height of the frame 100 relative to a ground surface (e.g., the height of the frame 100 at a location proximate to the support member 200) changes. As shown in FIG. 9, the adjustment nut 210 is made from a single piece of material (e.g., a piece of metal or plastic of sufficient thickness to support the weight of the frame 100) and includes fingers 214 that facilitate manual adjustment of the height of the frame 100. In operation, a user adjusts the position of each of the first, second, and third support members 201, 203, 205 (see FIG. 1) relative to the frame 100 to level the upper surface 102 of the frame 100. Alternatively, a user may adjust the height of the frame 100 proximate to each support member 200 for improved shooting advantage in certain directions. Importantly, the use of a suspended frame design for the game blind 10 allows a user to position the game blind 10 in almost any location, regardless of the surface grade or topology.

Figure 10:
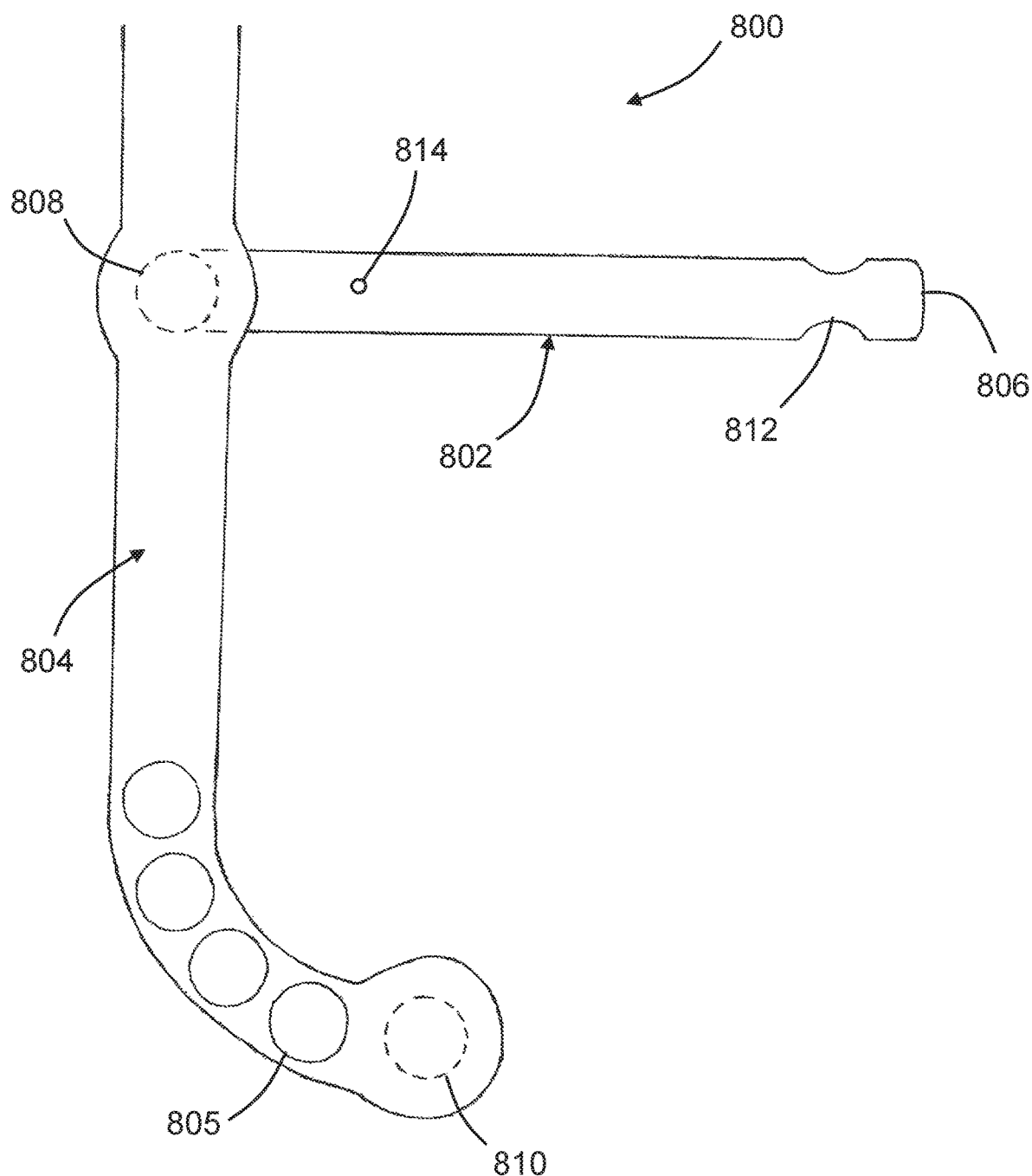
FIG. 10 is a top view of a portion of a helper rail from the game blind of FIG. 1, according to an illustrative embodiment.

Returning now to FIG. 1, the game blind 10 may further include a height adjustable helper rail 800 that is removably connected to one of the plurality of mounting points 108 in the helper rail leg 114. Among various benefits, the helper rail 800 provides a stable surface against which a weapon or other accessory may be positioned. The helper rail 800 also functions as a safety gate to prevent a user from falling out of the game blind 10. FIG. 10 shows a perspective view of the helper rail 800 of FIG. 1. As shown in FIG. 10, the helper rail 800 includes a support post 802 and a support rail 804 that is substantially perpendicular to the support post 802. As shown in the embodiment of FIG. 1, a connecting end 806 of the support post 802 is configured to be secured to the frame 100 at one of three mounting points 108, shown as helper rail mounting points 154 (e.g., holes), and a corresponding one of a plurality of aft mounting holes 156 (see FIG. 3) disposed in the aft extension 146. In the embodiment of FIG. 3, each one of the three aft mounting holes 156 is coaxial with a corresponding one of the helper rail mounting points 154 such that, when mounted, the support post 802 (see FIG. 1) is oriented in a direction that is substantially perpendicular to the upper surface 102 of the frame 100. Advantageously, the support post 802 may be repositioned, for example, into another one of the mounting points 108 to facilitate user entry and exit from the game blind 10. The support post 802 also includes a blind element attachment hole 814 configured to facilitate the attachment of a blind material such as a branch, evergreen elements, etc. For example, an evergreen element could be attached to the support post 802 using a tether received in the blind element attachment hole 814.

Figure 11A:
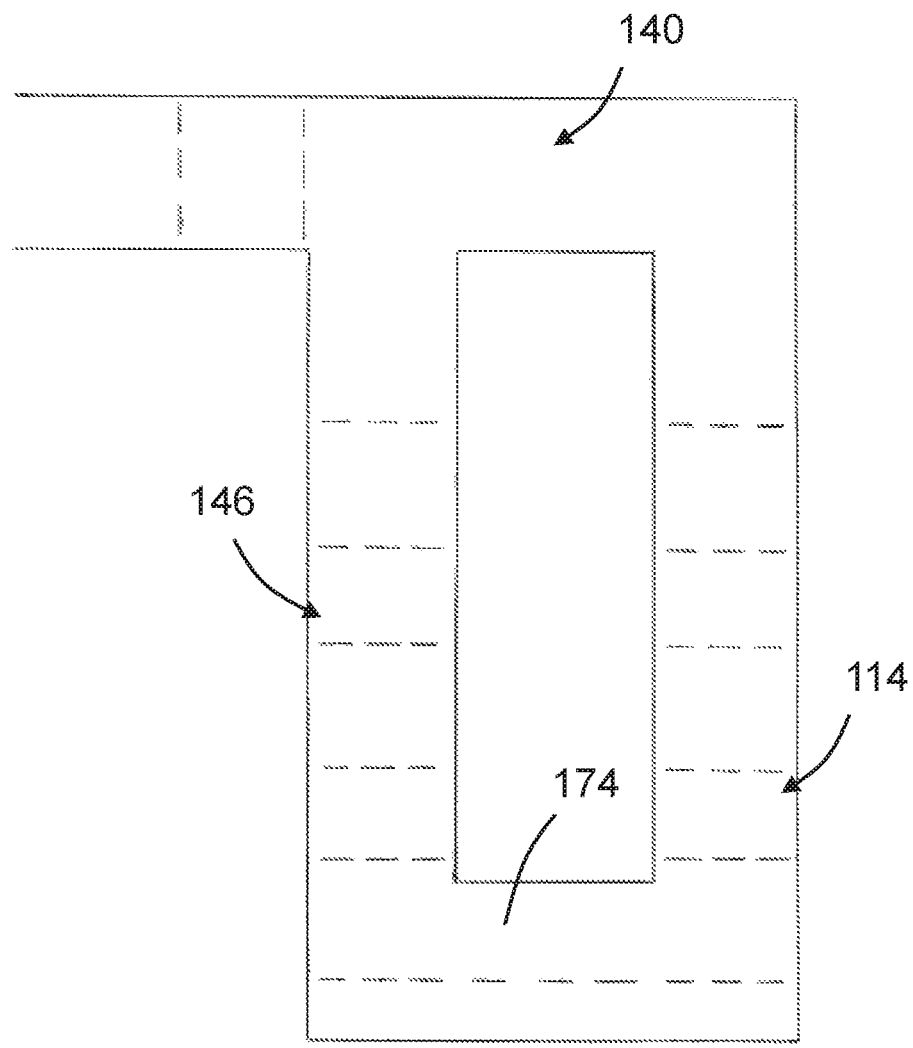
FIG. 11A is a side view of a helper rail leg and an aft extension for a game blind, according to an illustrative embodiment.
Figure 11B:
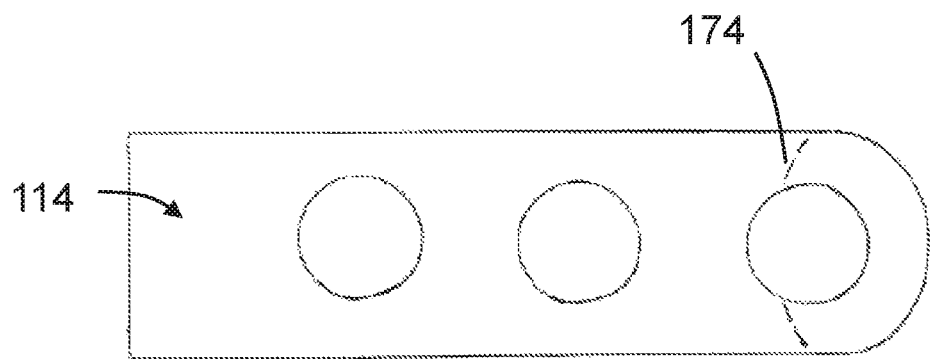
FIG. 11B is a top view of the helper rail leg of FIG. 11A.

As shown in FIGS. 11A-11B, in an embodiment, the frame 100 also includes a shield, shown as post shield 174, configured to prevent any components from entering a gap between the helper rail leg 114 and the aft extension 146.

As shown in FIG. 10, the helper rail 800 further includes at least one support rail 804, oriented substantially perpendicular to the support post 802. As shown in FIG. 1, the support rail 804 extends across a majority of the front portion 122 of the frame 100. As shown in FIG. 10, the support rail 804 includes a post opening 808 disposed at a central position along the support rail 804. The post opening 808 is configured to receive the support post 802 (e.g., the post opening 808 may be threaded or otherwise configured to couple the support rail 804 to the support post 802). The support rail 804 also includes positioning holes 810 at either end of the support rail 804 that are configured to help secure the helper rail 800 to the frame 100 in the collapsed position as will be further described. In FIG. 10, the support rail 804 is curved on either end proximal the positioning holes 810. In alternative embodiments, the support rail 804 is straight across or any other shape suited to provide adequate weapon support or protection of a user against injury. In other embodiments, the support rail 804 may further include a plurality of holes, shown as blind element storage holes 805, configured to support one or more blind elements 600 when the game blind 10 is in a collapsed position.

Returning to FIG. 2, the helper rail 800 (shown in FIG. 10) is height adjustable. Various height adjustment mechanisms are contemplated. For example, as shown in FIG. 2, the frame 100 may be outfitted with post set screws 158 that are configured to secure a position of the support post 802 (see FIG. 10) in one of the helper rail mounting points 154. In an alternative embodiment, the support post 802 may include a threaded potion and an adjustment nut disposed thereon. The adjustment nut is positioned in contact with the upper surface 102 of the frame 100. As the adjustment nut rotates, the height of the support post 802 relative to the upper surface 102 of the frame 100 changes.

Figure 12:
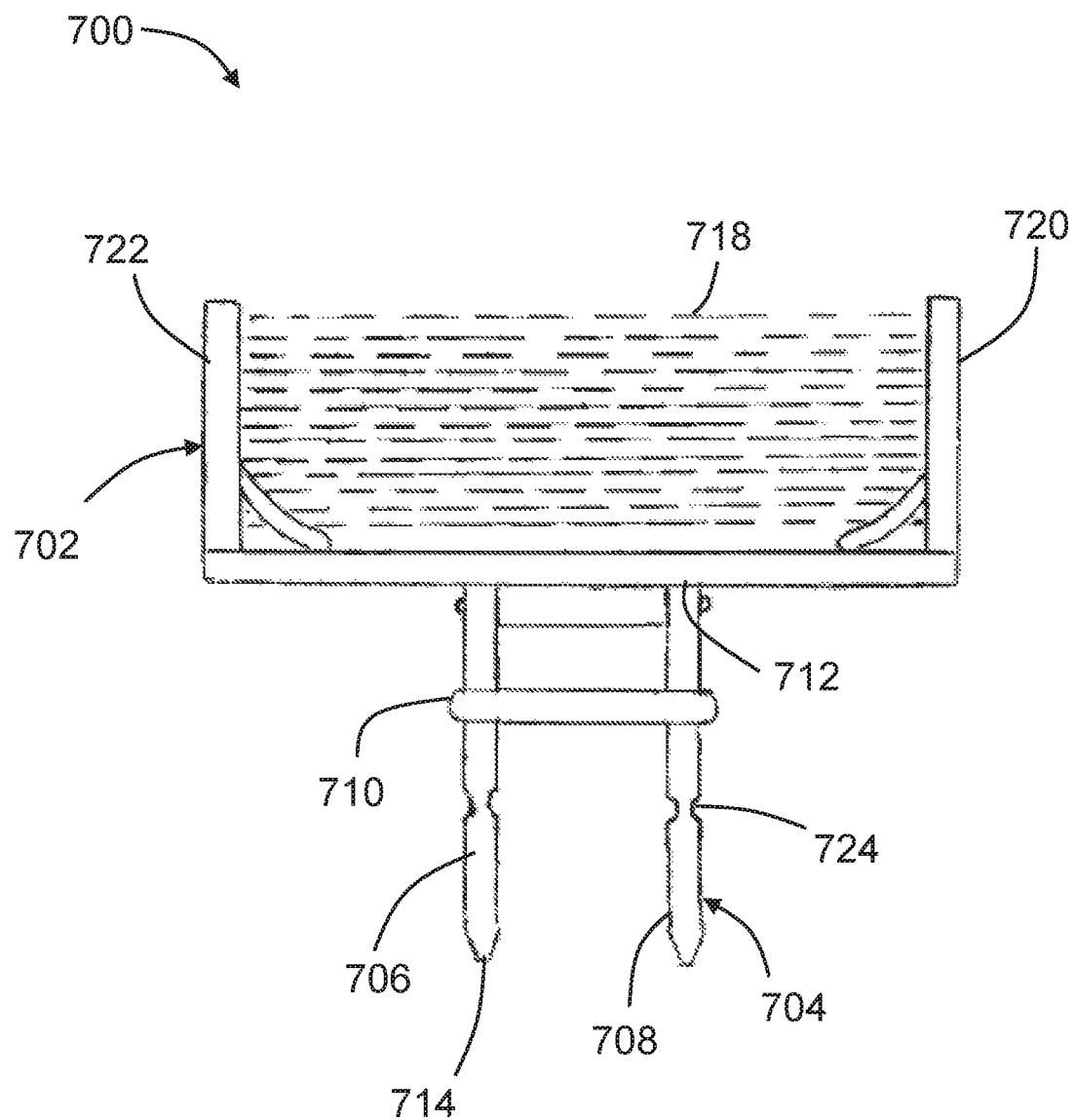
FIG. 12 is a front view of a seat assembly of the game blind of FIG. 1, according to an illustrative embodiment.

As shown in FIG. 1, the game blind 10 includes a seat assembly 700 having a seat 702 and a seat support 704 that together can comfortably accommodate a user during prolonged periods in the game blind 10. FIG. 12 shows a front view of the seat 702 and seat support 704 of FIG. 1. The seat support 704 includes two vertical posts 706, 708 and a cross-bar 710 that extends between the vertical posts 706, 708. As shown in FIG. 1, the cross-bar 710 contacts the upper surface 102 of the frame 100, thereby setting the height of the seat 702 relative to the frame 100. As shown in FIG. 12, the seat support 704 includes a seat end 712 and a mounting end 714 configured to engage with the frame 100. The seat 702 is pivotably disposed on the seat end 712 of the seat support 704. When assembled to the game blind 10 (shown in FIG. 1), the mounting end 714 (shown in FIG. 12) of the seat support 704 is received in mounting points 108, shown as holes 209 (shown in FIG. 2), centered toward a rear portion 116 of the frame 100 and a corresponding one of the seat assembly holes 134 disposed in lower rail 126 (shown in FIG. 6).

Figure 13:
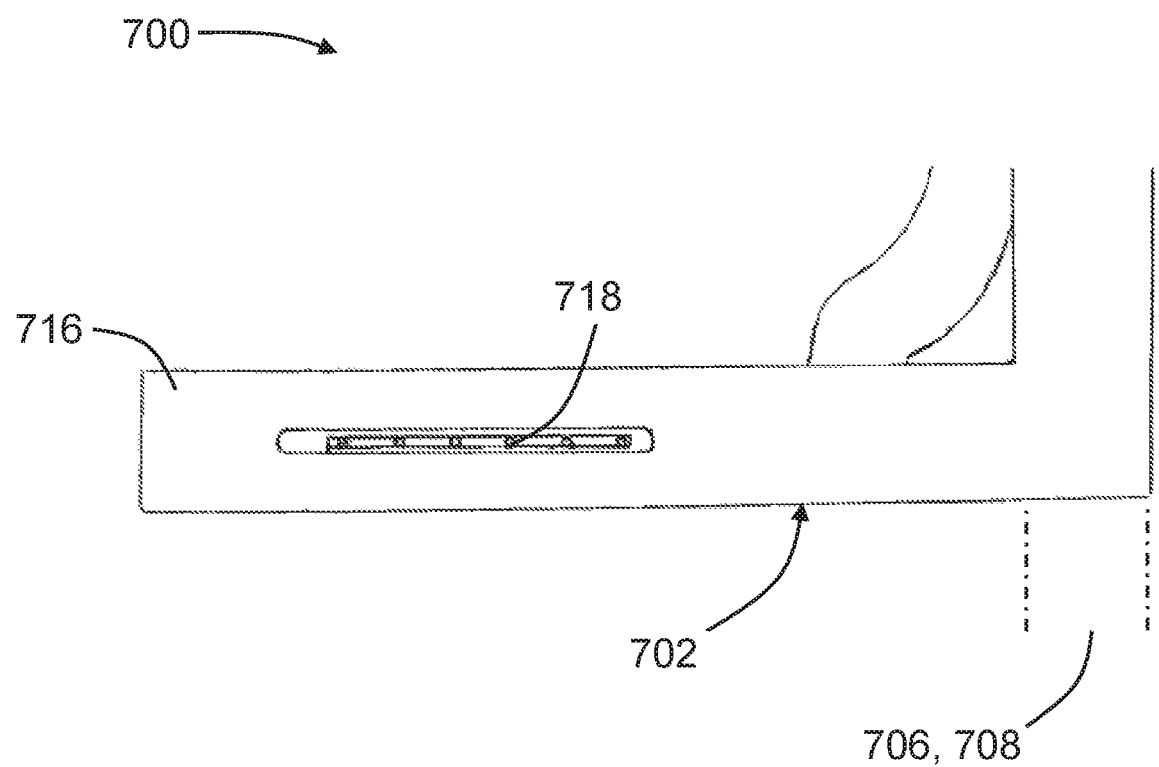
FIG. 13 is a side view of the seat assembly of FIG. 12.

In the embodiment of FIG. 12, the seat assembly 700 is configurable in a folded position (e.g., storage) and an alternate unfolded (e.g., in-use) position. In FIG. 12, the seat assembly 700 is shown in a folded position. In the folded position, the seat 702 is oriented in a direction that is substantially parallel with respect to the vertical posts 706, 708 of the seat support 704. FIG. 13 shows a side view of the seat assembly 700 rotated to an in-use position, in which the seat 702 is oriented in a direction that is substantially perpendicular with respect to the vertical posts 706, 708, or substantially parallel with the upper surface 102 of the frame 100 (shown in FIG. 1). In various alternative embodiments, the seat support 704 may also include a mounting interface (not shown) that is configured to attach to an accessory; for example, the mounting interface could take the form of a partially exposed bolt inserted in a threaded hole, a clip connector, or any other suitable hole or fastener. Among various accessories, the mounting interface could be used to secure a portable toilet to the seat support 704.

The seat 702 further comprises a seat frame 716 and a webbed user rest 718 disposed thereon. As shown in FIG. 12, the webbed user rest 718 extends between a left frame member 720 and a right frame member 722. Various materials are contemplated for the webbed user rest 718; for example, the webbed user rest 718 may be made from chord, caning materials, or any other materials suitable for an outdoor seat.

Figure 14A:
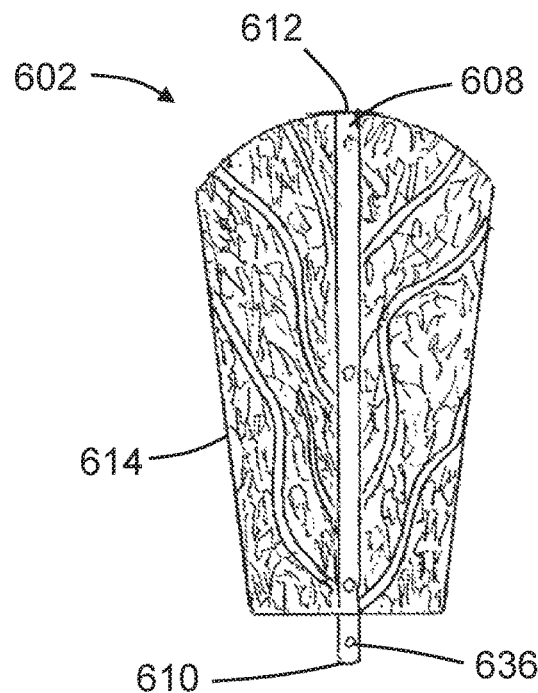
FIGS. 14A-14C are side views of different panel materials for a blind element, according to an illustrative embodiment.
Figure 14C:
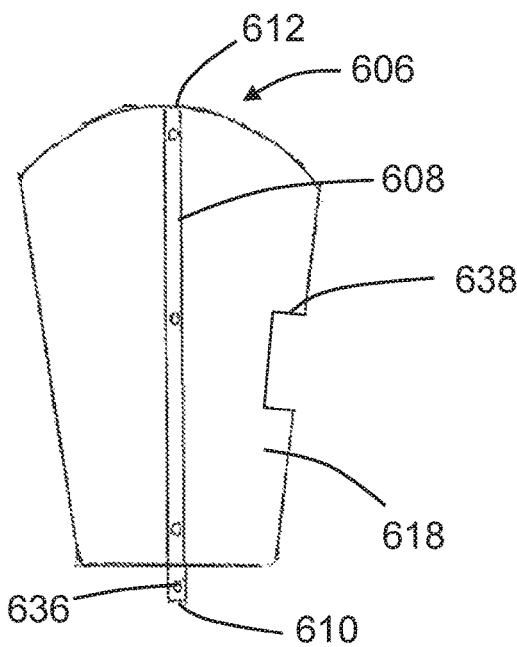
Figure 14B:
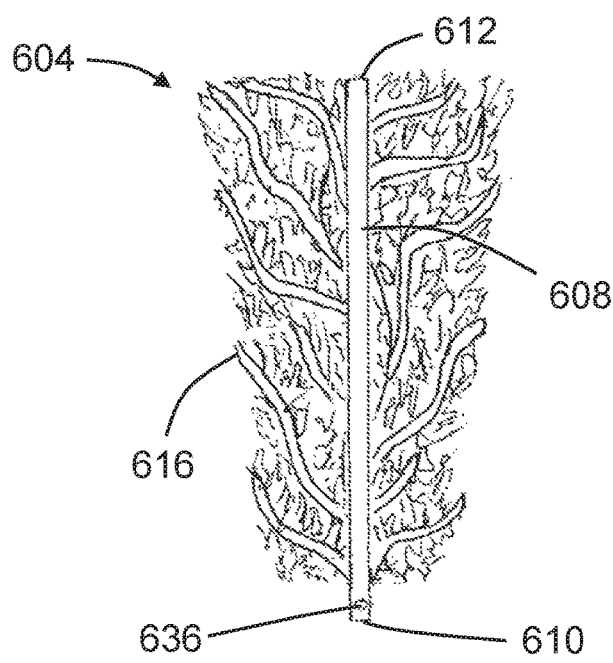

Referring to FIG. 1, the game blind 10 may further include at least one blind element 600, shown as panel-type blind 602, configured to at least partially conceal a user positioned within the opening 106 (e.g., such that the user is hidden from wild game surrounding the game blind 10). The panel-type blind 602 is engagable with at least one of the frame 100, and lower rail 126 via mounting points 108. In the embodiments of FIG. 1, three panel-type blinds 602 are disposed in the game blind 10 along the rear portion 116 of the game blind 10. The panel-type blinds may be one of a variety of different designs, of which illustrative embodiments are shown in FIGS. 14A-14C. As shown in FIGS. 14A-14C, each panel-type blind 602, 604, 606 includes a stabilizing leg 608 having a connecting end 610 and a free end 612. The connecting end 610 is mounted to the frame 100 via one of the mounting points 108. Each panel-type blind 602, 604, 606 further includes a blind panel 614, 616, 618 coupled to the stabilizing leg 608. The blind panels 614, 616, 618 may take a variety of forms. In the embodiment of FIG. 14A, the blind panel 614 is a single piece of transparent material (e.g., a plastic sheet such as Plexiglass, etc.) in a fan shape (polygon with an upper rounded edge). A design is printed onto the blind panel 614 to simulate the natural environment surrounding the game blind 10. For example, the design may be one of an evergreen or leaf pattern that at least partially occludes the hunter or observer from wild game. In the embodiment of FIG. 14B, the blind panel 616 includes colored pieces of plastic that simulate evergreen branches. In the embodiment of FIG. 14C, the blind panel 618 is a reflective material (e.g., Mylar or another reflective foil) that camouflages the game blind 10. In yet other embodiments, a thin adhesive film may be applied to one or more surfaces of the blind panel to allow a user to adhere natural materials to the blind panel directly.

Figure 15A:
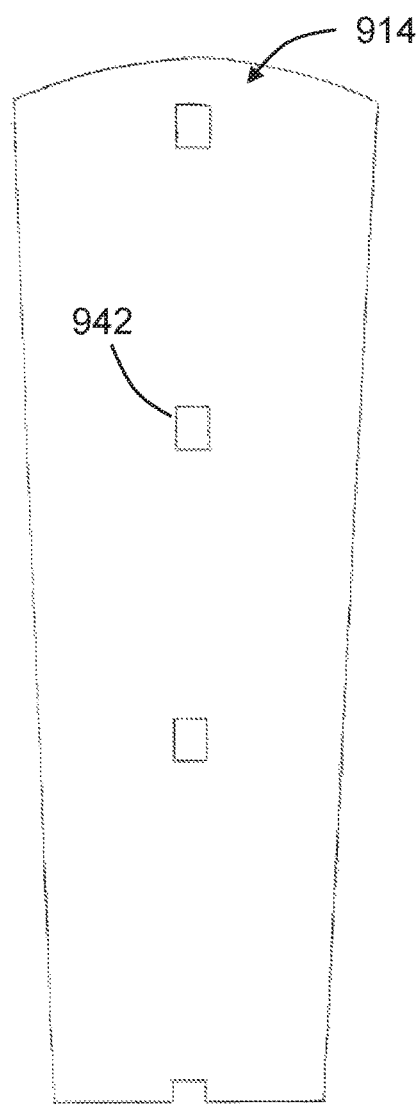
FIG. 15A is a front view of a blind panel for a blind element, according to an illustrative embodiment.
Figure 15B:
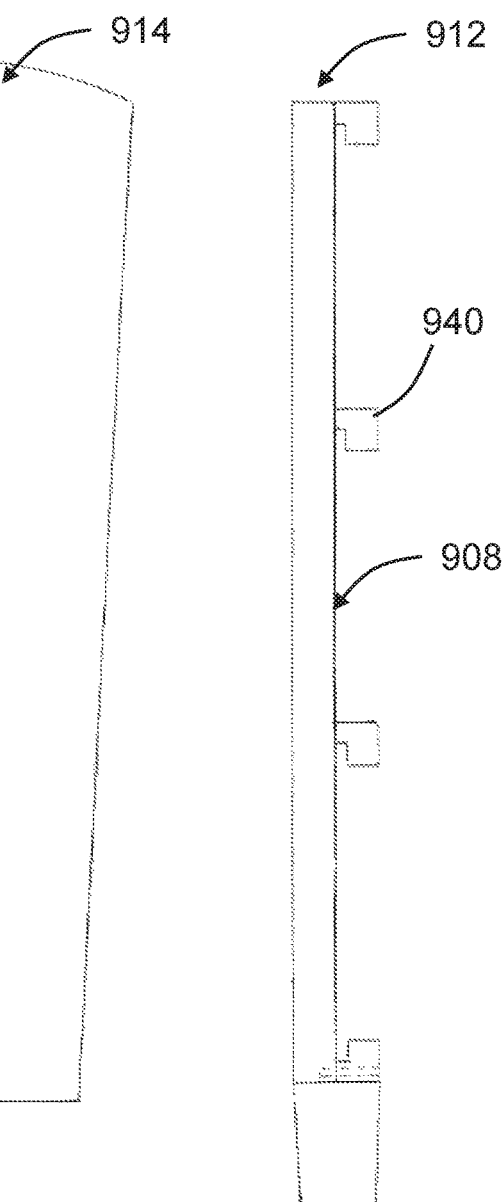
FIG. 15B is a side view of a stabilizing leg for the blind element of FIG. 15A, according to an illustrative embodiment.
Figure 15C:
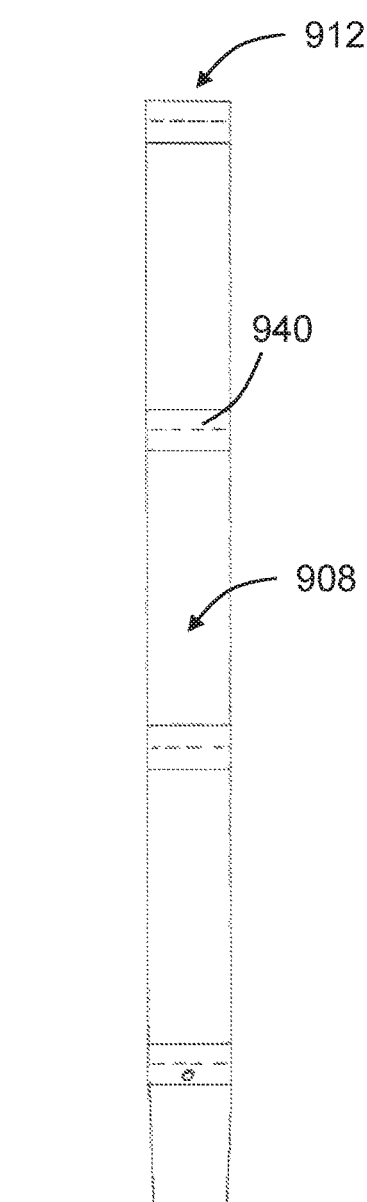
FIG. 15C is a front view of the stabilizing leg of FIG. 15B.

A variety of attachment mechanisms may be used to couple the blind panel 618 of FIG. 14C to the stabilizing leg. FIGS. 15A-15C provide an illustrative embodiment of an attachment mechanism for a blind element 900. As shown in FIGS. 15A-15C, the blind element 900 includes a stabilizing leg 908 and a blind panel 914. The stabilizing leg 908 further includes a plurality of holders, shown as latches 940, disposed between a connecting end 910 and a free end 912 of the stabilizing leg 908. The blind panel 914 includes a plurality of apertures 942 that are configured to receive the latches 940 to secure the blind panel 914 to the stabilizing leg 908. As shown in FIG. 15B, each latch 940 is formed from a single piece of material in a hook shape. In other embodiments, the number and position of latches 940 may be different. In the embodiment of FIG. 15B-15C, the stabilizing leg 908 includes four latches 940. The latch 940 closest to the connecting end 910, a lowermost latch 940, is removably disposed on the stabilizing leg 908. To attach the blind panel 914 to the stabilizing leg 908, the lowermost latch 940 is removed from the stabilizing leg 908. Next, the blind panel 914 is secured to the three latches 940 closest to the free end 912 of the stabilizing leg 908 by first inserting each latch 940 through a corresponding one of the apertures 942 on the blind panel 914 and then raising the blind panel 914 a small distance toward the free end 912 (e.g., to "hook" or fully engage the blind panel 914 into the latches 940). Finally, the lowermost latch 940 is reattached to the stabilizing leg 908.

Figures 16A, 16B, 16C:
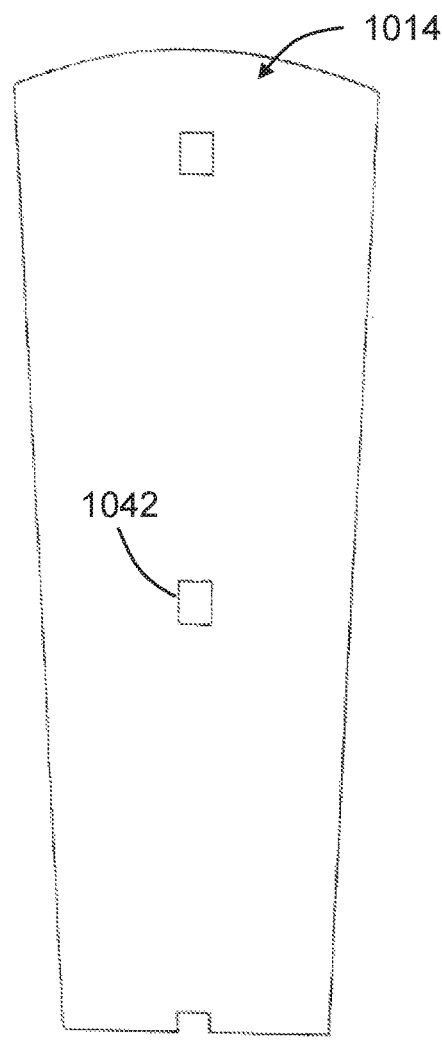
FIG. 16A is a front view of a blind panel for a blind element, according to an illustrative embodiment.
FIG. 16B is a side view of a stabilizing leg for the blind element of FIG. 16A, according to an illustrative embodiment.
FIG. 16C is a front view of the stabilizing leg of FIG. 16B.

Another embodiment of an attachment mechanism for a blind element is shown in FIGS. 16A-16C. Like the embodiment of FIGS. 15A-15C, the blind element 1000 includes a plurality of holders, shown as latches 1040 disposed on the stabilizing leg 1008. As shown in FIG. 16B, the blind element 1000 includes three latches 1040 affixed to the stabilizing leg 1008, each of the latches 1040 configured to be received in a corresponding aperture 1042 on the blind panel 1014. The blind panel 1014 is secured to the stabilizing leg 1008 by inserting each latch 1040 through a corresponding one of the apertures 1042 on the blind panel 1014. Each latch 1040 "hooks" or grabs onto the blind panel 1014 proximate to an upper edge of a corresponding one of the apertures 1042. In the embodiment of FIGS. 16A-16C, the blind panel 1014 is retained by each of the latches 1040 by gravity. In the embodiment shown in FIGS. 16A-16C, the blind panel 1014 may be easily removed from the stabilizing leg 1008 to facilitate transport and storage of the game blind 10.

Figure 17:
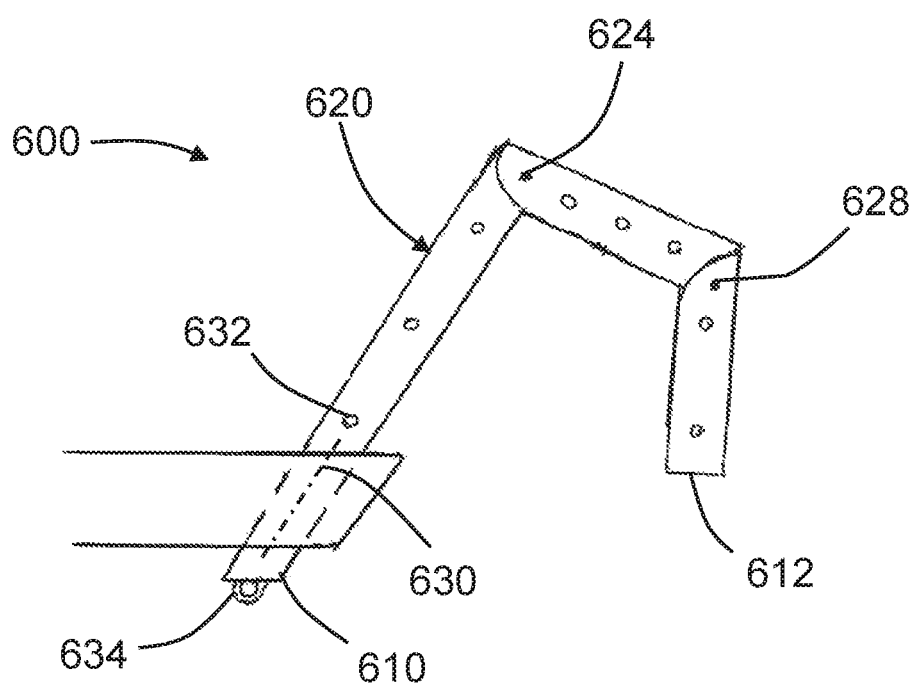
FIG. 17 is a side view of a breakaway blind element, according to an illustrative embodiment.

In an illustrative embodiment, the blind elements 600 are blind posts 620 as shown in FIG. 17. Each blind post 620 is configured to include faux evergreen branch elements or other blind materials, which are disposed between the connecting end 610 of the blind post 620 and a free end 612 of the blind post 620. FIG. 17 shows a side view of a blind post 620 according to an illustrative embodiment. The blind post 620 may include at least one pivot member 624, 628 disposed between the connecting end 610 and the free end 612. In the embodiment of FIG. 17, the blind post 620 includes two pivot members 624, 628. Each pivot member 624, 628 allows the blind post 620 to tilt with respect to an axis 630 of the stabilizing leg 608. Among other advantages, the pivot members 624, 628 allow a user to customize the layout of the game blind 10 while observing or hunting game.

As shown in FIG. 17, the blind post 620 may also include a cross-hole 632 disposed in the stabilizing leg 608 and oriented in a direction that is substantially perpendicular to an axis 630 of the stabilizing leg 608. The cross-hole 632 may be configured to accommodate wire, tie straps, or other tethering means to secure faux evergreen branch elements, netting, or other blind materials to the blind post 620.

Referring again to FIG. 17, the blind post 620 (or any of the panel-type blinds 602, 604, 606 provided in 14A-14C) may be tapered on its connecting end 610 to a diameter that is slightly greater than a receiving hole in the frame 100 (one of the mounting points 108 shown in FIG. 1) to set the position of the blind post 620 relative to the upper surface 102 of the frame 100. In the embodiment shown in FIG. 17, the blind post 620 also includes an eyebolt 634 disposed in its connecting end 610. Among other uses, the eyebolt 634 may be utilized to assist a user in transporting a plurality of blind posts 620. Alternatively, the eyebolt 634 may be replaced with a slot through its connecting end 610 or another type of tether fastener.

The blind elements 600 may be secured to the frame 100 in any one of a variety of different configurations. In the illustrative embodiment of FIG. 1, the frame 100 is configured to accommodate a total of 17 blind elements 600. The seven blind elements 600 toward the rear portion 116 of the frame 100 may have a larger height (i.e., a length along a longitudinal axis of the stabilizing bar for the blind elements 600) as compared to the ten blind elements 600 toward the front portion 122 of the frame 100, an apparatus configuration that provides clear line-of-sight for a hunter or observer positioned in the game blind 10. In an illustrative embodiment, a height of the seven blind elements 600 toward the rear portion 116 of the frame 100 is approximately 43 in., while a height of the ten blind elements 600 toward a front portion 122 of the frame 100 is approximately 30 in. In other embodiments, the height of any of the blind elements 600 may all be the same.

According to an illustrative embodiment, the game blind 10 further includes an accessory support system 500 configured to accommodate at least one of a weapon, a camera, and an umbrella. As shown in FIG. 1, the accessory support system 500 is secured to the game blind 10 via at least one of the mounting points 108, shown as holes 160, on the frame 100. The accessory support system 500 includes primary support 502 having a first end 504 and a second end 506. The primary support 502 may take the form of a pole, rod, or post of various cross-sectional shapes and sizes. As shown in FIG. 1, the primary support 502 takes the form of a cylindrical pole. The first end 504 of the primary support 502 is configured to be coupled to one of the holes 160 in the frame 100 and a corresponding one of the accessory support holes 132 in the lower rail 126 (see FIG. 6). As shown in FIG. 4, the holes 160 are coaxial with the accessory support holes 132, such that the primary support 502 (see FIG. 1) is oriented in a direction that is substantially perpendicular to the upper surface 102 of the frame 100. Among other functions, the primary support 502 may be utilized to secure various accessories to the game blind 10 for ready access by a user; for example, the primary support 502 may be used to secure a weapon (as shown in FIG. 1), camera, and umbrella.

As shown in FIG. 1, the accessory support system 500 includes two retaining bodies, a first retaining body, shown as a lower retaining body 508 is disposed proximate to the first end 504 of the primary support 502 and a second retaining body, shown as upper retaining body 510 is disposed proximate to the second end 506 of the primary support 502. Among other functions, the lower retaining body 508 sets the height of the primary support 502 relative to the upper surface 102 of the frame 100.

Figure 18:
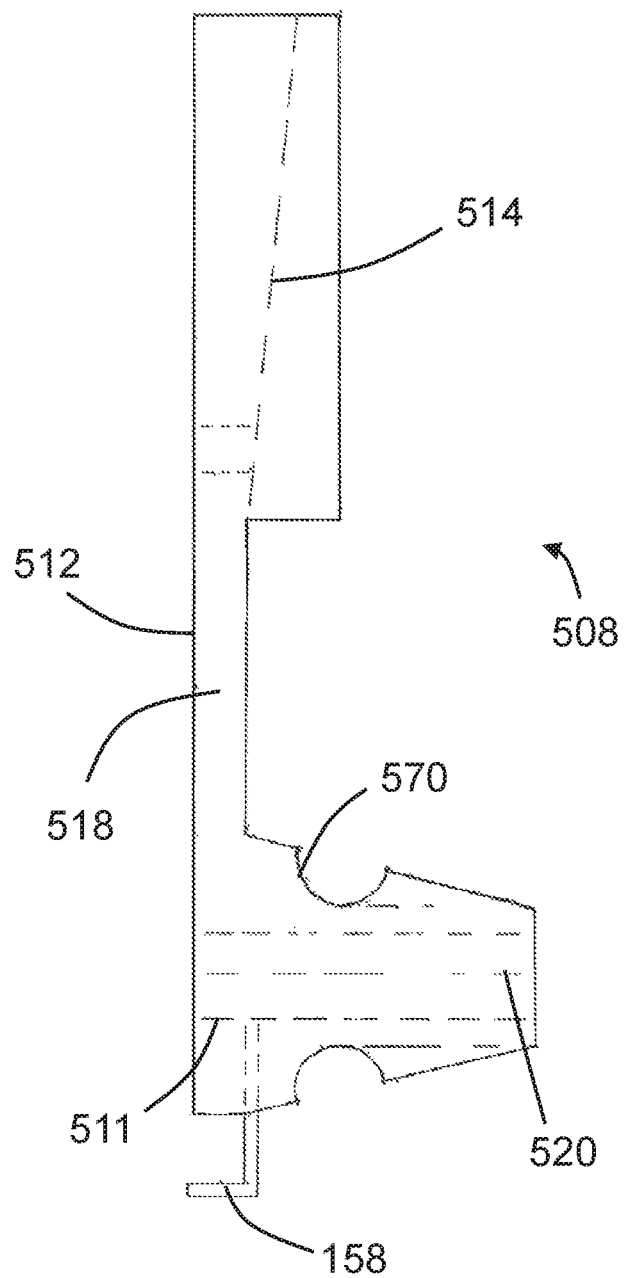
FIG. 18 is a side view of a lower part of a gun holder, according to an illustrative embodiment.

FIGS. 16 and 17 show a side and top view, respectively, of the lower retaining body 508 for the accessory support system 500. As shown in FIG. 18, the lower retaining body 508 is conical in shape, having a diameter at one end that is smaller than the diameter at the other end (e.g., frustoconical), although a variety of other shapes may be utilized. The lower retaining body 508 includes a through-hole 511 centrally disposed on the lower retaining body 508 and configured to receive the primary support 502. As shown in FIG. 18, the height of the primary support 502 relative to the upper surface 102 of the frame 100 is set using a set screw 158 disposed on the lower retaining body 508. Alternatively, the height of the primary support 502 relative to the upper surface 102 of the frame 100 may be set using a retaining O-ring (not shown) configured to contact a top surface of the lower retaining body 508. According to various alternative embodiments, the O-ring prevents the primary support 502 from passing through the lower retaining body 508. As shown in FIG. 18, a base surface 512 of the lower retaining body 508 is configured to contact the upper surface 102 of the frame 100 (see also FIG. 1). In other embodiments, any other suitable fastener that secures the lower retaining body 508 into position relative to the primary support 502 may be used.

Figure 19:
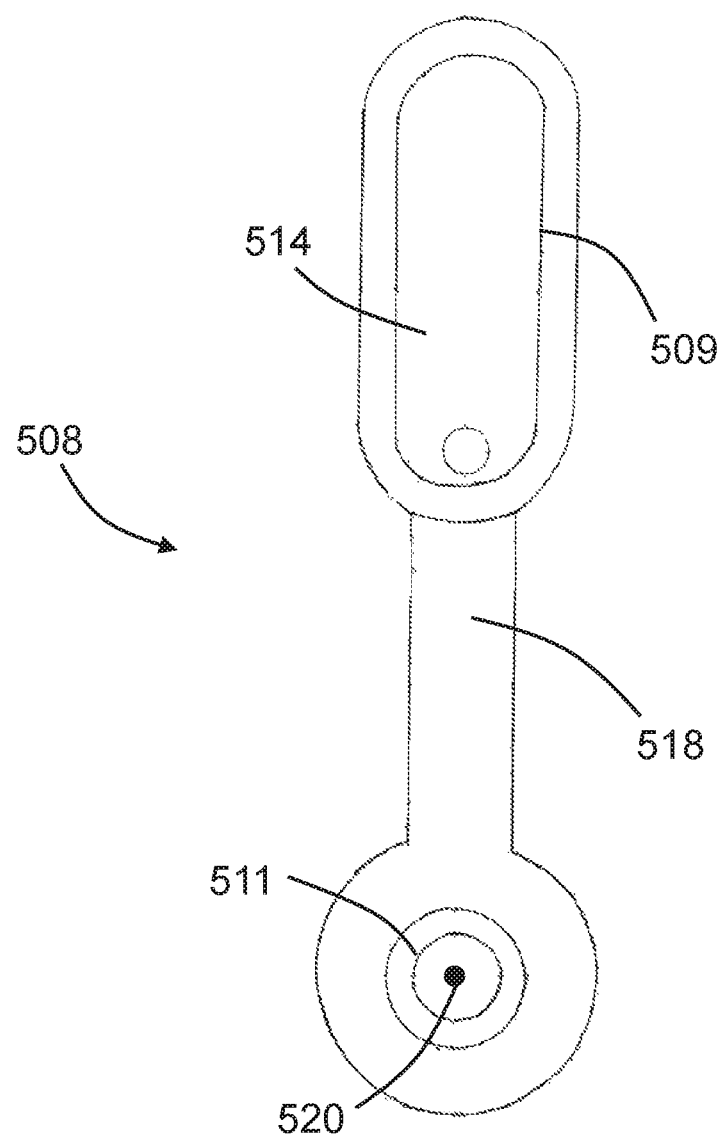
FIG. 19 is a top view of the lower part of the gun holder of FIG. 18.
Figure 20:
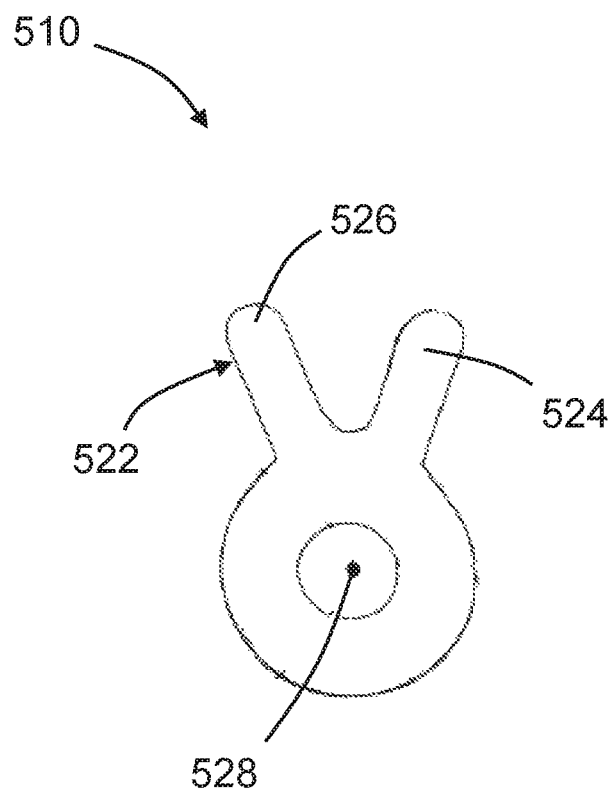
FIG. 20 is a top view of an upper part of the gun holder of FIG. 19, according to an illustrative embodiment.

As shown in FIG. 1, together, the lower retaining body 508 and the upper retaining body 510 form a gun holder. As shown in FIG. 18, the lower retaining body 508 includes a recessed area 514 shaped for receiving the stock of a gun. The lower retaining body 508 may also include a swivel (not shown) disposed in the recessed area 514 to orient the stock of a gun and to prevent the gun from moving around within the boundaries 509 (as shown in FIG. 19) of the recessed area 514. The recessed area 514 is attached to the lower retaining body 508 by a lateral extension piece 518 that is oriented perpendicular to a central axis 520 of the lower retaining body 508 (e.g., a central axis 520 of the primary support 502). FIG. 20 shows a top view of the upper retaining body 510. As shown in FIG. 20, a barrel hook 522 is disposed on the upper retaining body 510. The barrel hook 522 takes the form of two prongs 524, 526 that extend away from a central axis 528 of the upper retaining body 510 in a direction that is substantially perpendicular to the central axis 528 of the upper retaining body 510. As shown in FIG. 1, the barrel hook 522 is configured to maintain the barrel of a gun in a direction that is substantially parallel to the primary support 502.

Figure 21:
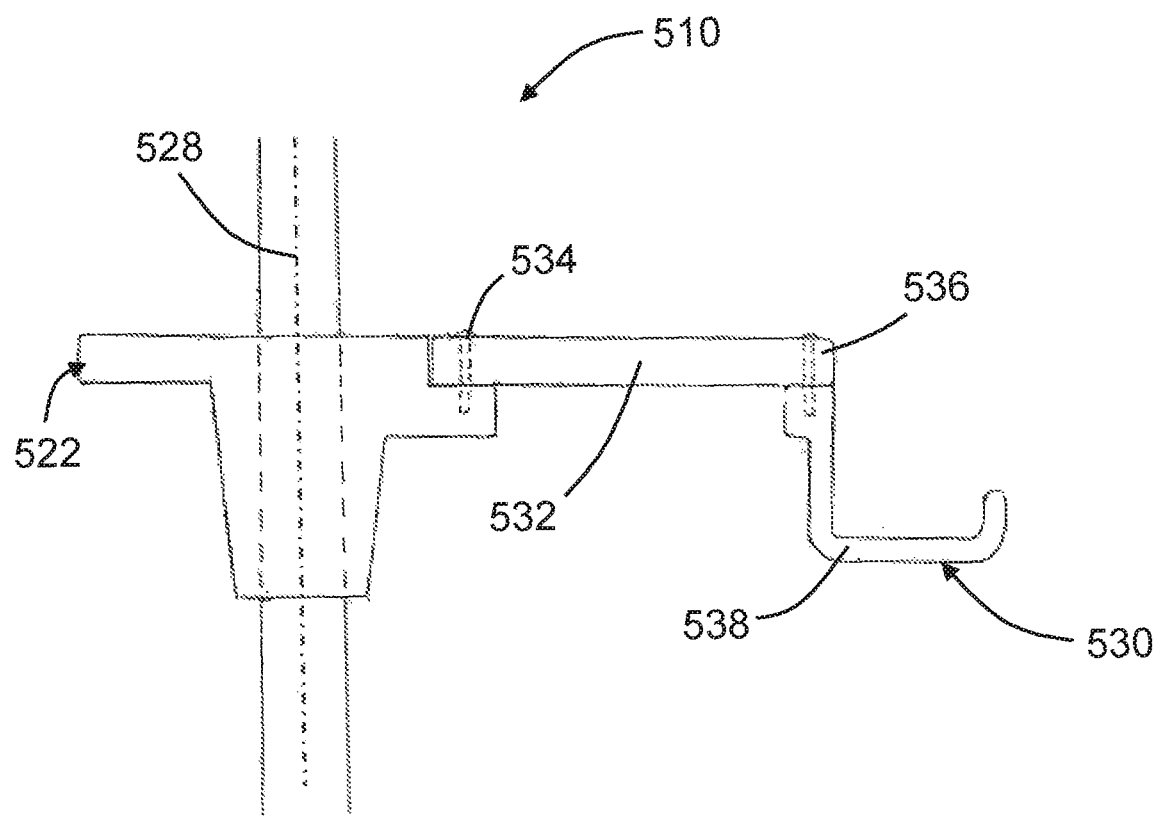
FIG. 21 is a side view of a combination gun and bow holder, according to an illustrative embodiment.

As shown in FIGS. 1 and 21, the game blind 10 also includes a bow hanger 530 incorporated on the upper retaining body 510. In alternative embodiments, the bow hanger 530 may have its own retaining body 510. As shown in FIG. 21, the upper retaining body 510 further includes a spacer arm 532 having a retaining end 534 and a bow hook end 536. The retaining end 534 is pivotably attached to the upper retaining body 510 and is configured to pivot in a plane that is substantially perpendicular to the central axis 528 of the upper retaining body 510. Similarly, a bow hook 538 is pivotably disposed on the bow hook end 536 of the spacer arm 532, such that the bow hook 538 may also pivot in a plane that is substantially perpendicular to the central axis 528 of the upper retaining body 510. As shown in FIG. 21, the barrel hook 522 is disposed on the upper retaining body 510 at a circumferential position on the upper retaining body 510 that is opposite the spacer arm 532.

Figure 22:
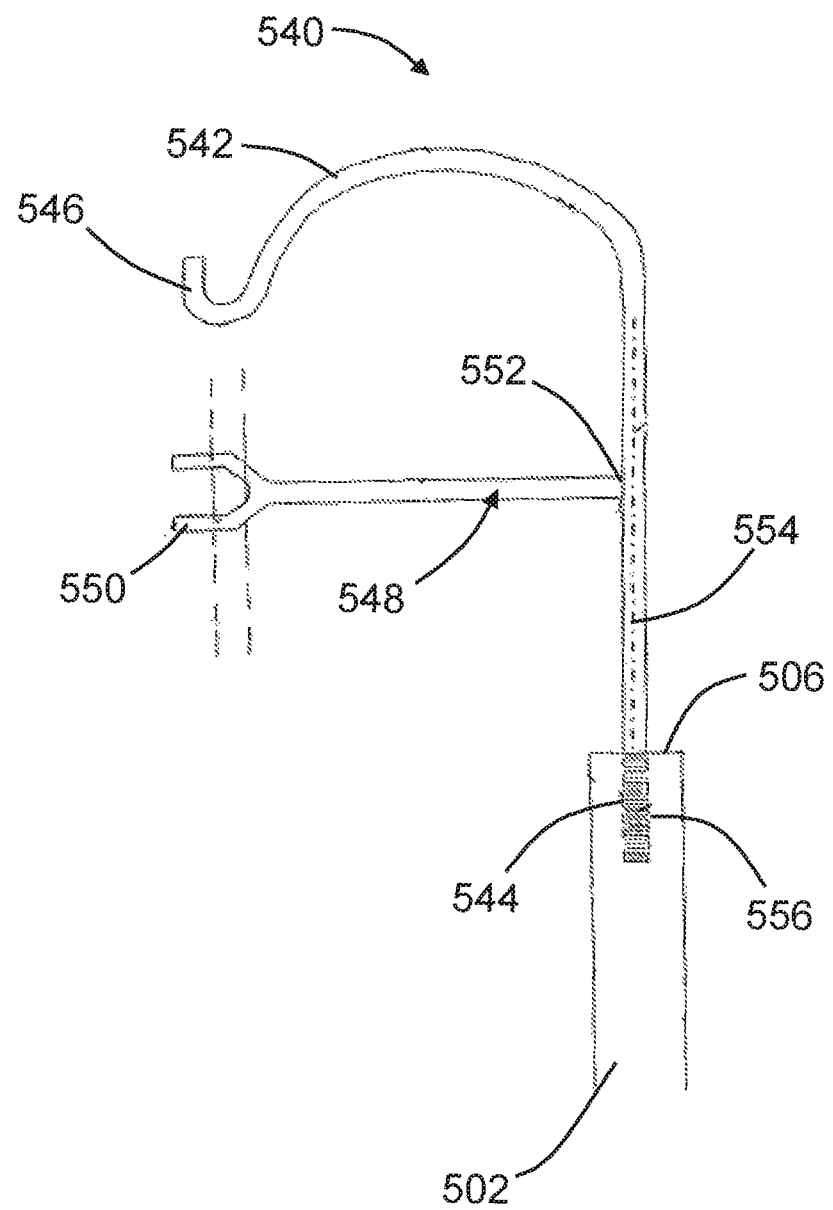
FIG. 22 is a side view of an umbrella holder for the game blind of FIG. 1, according to an illustrative embodiment.

FIG. 22 shows an illustrative embodiment of an umbrella holder 540 disposed on the primary support 502. FIG. 22 shows a rear view of the umbrella holder 540. As shown in FIG. 22, the umbrella holder 540 includes a curved rod 542 having a threaded end 544 and a support end 546. The umbrella holder 540 may further include an umbrella pole support rod 548 having a forked end 550 and an unforked end 552. As shown in FIG. 22, the unforked end 552 of the umbrella pole support rod 548 is disposed on the curved rod 542 proximal the threaded end 544. The umbrella pole support rod 548 is oriented substantially perpendicular to an axis 554 of the curved rod 542 in at least one location. The support end 546 of the curved rod 542 latches to part of the umbrella, while the umbrella pole support rod 548 maintains the umbrella at a user specified orientation. As shown in FIG. 22, the threaded end 544 of the curved rod 542 is received within a threaded umbrella support hole 556 at the second end 506 of the primary support 502. In alternative embodiments, the threaded umbrella support hole 556 is used to secure an additional rod or extension onto the end of the primary support 502 to increase its length.

Figure 23:
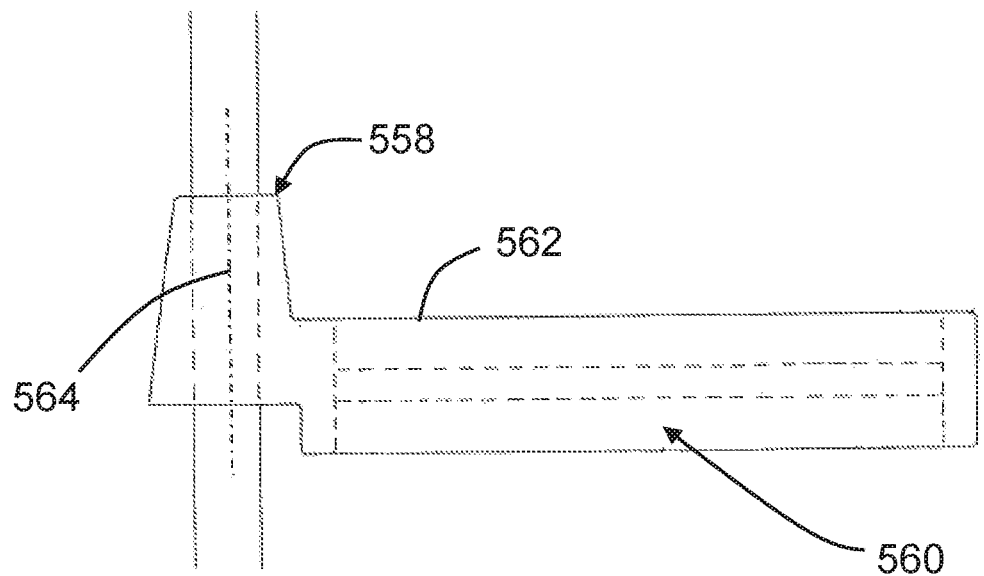
FIG. 23 is a retaining body with an integrated table, according to an illustrative embodiment.
Figure 24:
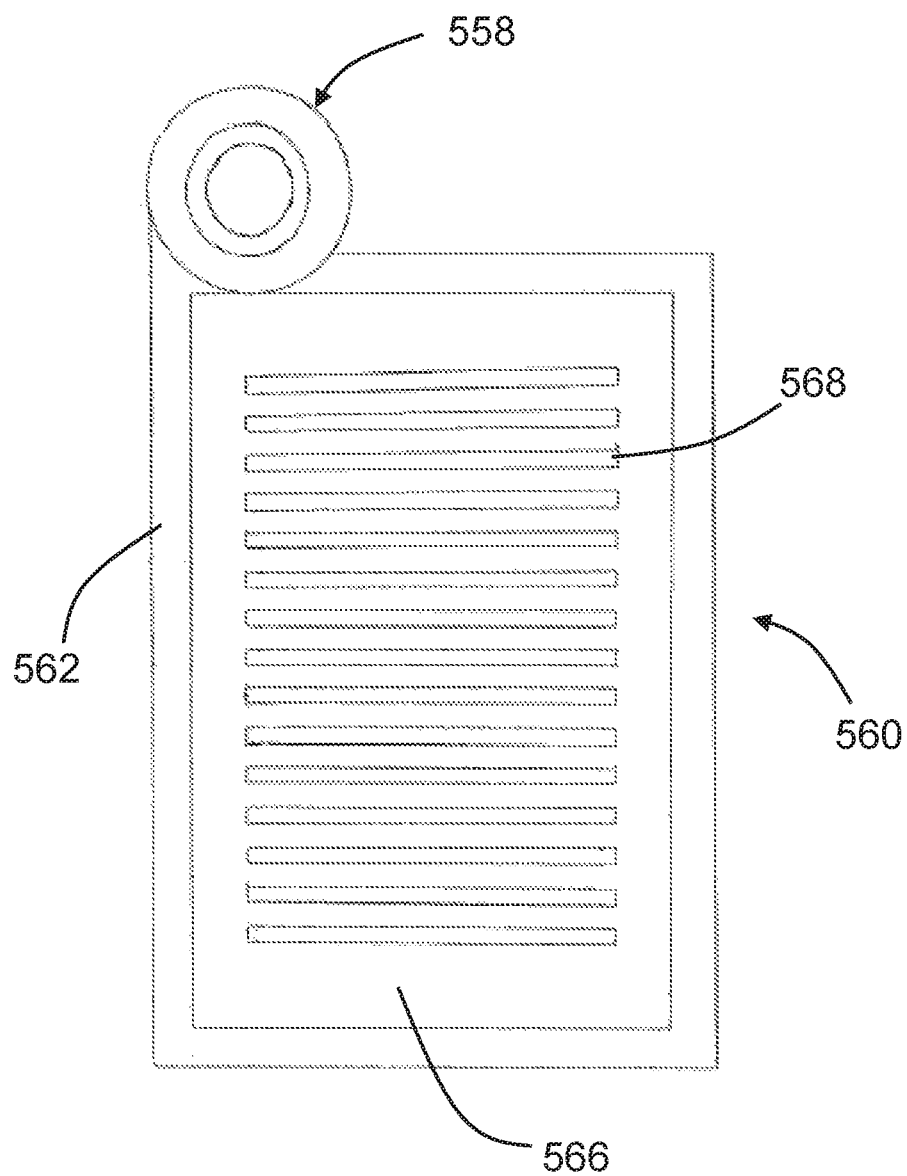
FIG. 24 is a top view of the retaining body with an integrated table of FIG. 23.

Various other accessory supports may be integrated on the primary support 502 via a retaining body. For example, a retaining body may be adapted for use as a table or to accommodate various other user accessories. FIG. 23 shows a side view of a retaining body, shown as table retaining body 558 adapted for use as a table 560. The table 560 includes an extension 562 oriented perpendicular to an axis 564 of the table retaining body 558. FIG. 24 shows a top view of the table 560. As shown in FIG. 23, the extension 562 includes a recessed section 566. A plurality of rectangular slots 568 are disposed on the recessed section 566. Among other functions, the rectangular slots 568 allow water to drain from the recessed section 566.

In any of the above embodiments, the retaining bodies 508, 510, 558 may be secured to the primary support 502 (shown in FIG. 1) using O-rings, pins, or other fastening means. Additionally, the retaining bodies 508, 510, 558 may be located on other supports connected to the game blind 10.

In the illustrative embodiment of FIG. 1, the game blind 10 is reconfigurable between an in-use position, where at least one of the plurality of support members 200 is substantially perpendicular to the upper surface 102 of the frame 100, and a collapsed position, where at least one of the plurality of support members 200 is substantially parallel to the upper surface 102. FIG. 3 shows the game blind 10 in a partially collapsed position, according to an illustrative embodiment. As shown in FIG. 3, in the collapsed position, each one of the support members 200 is inserted into a corresponding one of the three sets of extension pieces 314 in the storage plate 300.

Each of the helper rail 800, seat assembly 700, accessory support system 500, and blind elements 600 are also secured to the storage plate 300 in the collapsed position. In the embodiment shown in FIG. 3, the first end 504 of the primary support 502 for the accessory support system 500 is received within the accessory support storage hole 312, while the second end 506 of the primary support 502 is received within a second end support hole 168 disposed in the lower support 140 of the frame 100. The second end support hole 168 is coaxial with the accessory support storage hole 312 such that, in the collapsed position, the primary support 502 is oriented in a direction that is substantially parallel to the upper surface 102 of the frame 100.

The helper rail 800, the seat assembly 700, and the blind elements 600 are also coupled to the storage plate 300 in the collapsed position. Similar to the accessory support system 500, the helper rail 800 (shown in FIG. 10) is supported in at least two different points in the collapsed position. The support post 802 of the helper rail 800 is received within the helper rail storage hole 313 (shown in FIG. 4) on the storage plate 300, while each of the positioning holes 810 located at an end of the support rail 804 interface with a corresponding one of the studs 166 in the locating member 164 of the frame 100. Advantageously, in the collapsed position, the support post 802 for the helper rail 800 may be used as a handle to facilitate transport of the game blind 10.

In the embodiment of FIGS. 3 and 4 (and seat assembly components shown in FIG. 12), the seat assembly 700 and blind elements 600 are supported at a single point. As shown in FIG. 4, each of the vertical posts 708 of the seat assembly 700 is received in a corresponding one of the seat assembly storage holes 310, while each of the blind elements 600 are received within a corresponding one of the blind element storage holes 308. Note that the storage plate 300 also includes a series of standoff or spacer elements, shown as central spacers 332 and blind standoffs 334. The central spacers 332 are configured to position parts of the blind elements 600 (e.g., blind panels 614, 616, 618) to prevent them from blocking the accessory support storage hole 312. Similarly, the blind standoffs 334 prevent the blind panels 614, 616, 618 from contacting the front surface 304 of the storage plate 300 and from interfering with other components in the collapsed position.

In the collapsed position, at least one of the plurality of support members 200 is configured to secure at least one of the helper rail 800, the seat assembly 700, and the accessory support system 500 in position relative to the frame 100. At least one of the helper rail 800, the seat assembly 700, and the accessory support system 500 further include a locking member 812, 724, 570 that is configured to secure the component in position relative to the frame 100. In the embodiment of FIG. 1, each of the helper rail 800, the seat assembly 700, and the accessory support system 500 include a locking member 812, 724, 570 (see FIGS. 10, 12, and 18, respectively) configured to interface with one of the support members 200 in the collapsed position. The locking member 570 for the accessory support system 500 is disposed on the lower retaining body 508. As shown in FIG. 18, the locking member 570 on the lower retaining body 508 takes the form of a circular groove that extends along the perimeter of the lower retaining body 508, approximately mid-way between the top and bottom of the lower retaining body 508. As shown in FIG. 3, in the collapsed position, the support member, shown as first support member 201, is received within the second pair 322 of extension pieces 314. The holes through the first pair of extension pieces 314 are aligned with the locking member 570 on the lower retaining body 508 such that the shaft of the first support member 201 is received within the locking member 570, thereby preventing movement of the accessory support system 500 with respect to the frame 100 in the collapsed position.

Similar locking features are provided to secure the seat assembly 700 and the helper rail 800. As shown in FIG. 12, each of the two vertical posts 708 for the seat assembly 700 include a locking member 724 disposed approximately half way between the seat end 712 and the mounting end 714. The locking member 724 for the seat assembly 700 again takes the form of a circular groove along the outer perimeter of the each of the vertical posts 708. In the embodiment of FIG. 3, the locking member 724 for the seat assembly 700 (not shown) is configured to interface with the shaft of the second support member 203, which is received within the third pair 326 of the extension pieces 314. The second support member 203 also interfaces with the locking member 812 for the helper rail 800. As shown in FIG. 10, the locking member 812 for the helper rail 800 is disposed proximate to the connecting end 806 of the support post 802. Again, the locking member 812 takes the form of a circular groove along the outer perimeter of the support post 802. In the embodiment of FIG. 3, the third support member 205 is received within the first pair 318 of extension pieces 314. The third support member 205 does not lock any other components of the game blind 10 in place. In alternative embodiments, the arrangement of holes and extension pieces 314 in the storage plate 300 may be different.

In various alternative embodiments, one or more of the locking members 812, 724, 570 are grooves of a different shape or arrangement. In other embodiments, the locking members 812, 724, 570 take the form of clips or tabs that interface with a corresponding feature (e.g., a small extension) on one of the support members 200, the storage plate 300, and the frame 100. In yet other embodiments, the locking members 812, 724, 570 take the form of a through-hole that is configured to receive a pin or other locking feature. By way of example, as shown in FIGS. 14A-14B, the stabilizing leg 608 of each of the panel-type blind elements 602, 604, 606 include a through-hole, shown as mating hole 636 oriented in a direction that is substantially perpendicular to an axis of the stabilizing leg 608. With the game blind 10 in the collapsed position, the connecting end 610 of stabilizing leg 608 extends through the storage plate 300 and beyond the rear surface 306 of the storage plate 300 (not shown). A pin or other locking feature (not shown) may be inserted through the mating hole 636 to secure the panel-type blind element 602, 604, 606 in position relative to the frame 100. Due to the alignment of the blind element storage holes 308 in the storage plate 300, a single pin may be utilized to secure multiple panel-type blind elements 602, 604, 606 (e.g., a single pin moveably connected to the frame by a chain or other tether). To facilitate transport of the game blind 10, one or more of the blind panels 614, 616, 618 may include a slot 638 disposed in a side of the panel (see FIG. 14C) to allow a user's hand to more easily grasp the support post 802 for the helper rail 800 (e.g., for lifting and carrying the game blind 10).

In other embodiments, locking members may also be included on any one of the support members 200 to prevent the support members 200 from falling out of the game blind 10 when configured in the collapsed position.

According to an illustrative embodiment, a method of assembly for the game blind 10 (e.g., from the collapsed position to the in-use position) includes placing the game blind 10 on its side such that a side surface 170 of the side cover 162 (see FIG. 3) is proximate to a ground surface, removing each of the support members 200 (e.g., the first, second, and third support members 201, 203, 205) from a corresponding pair of extension pieces 314 in the storage plate 300, and inserting each of the support members 200 into a corresponding one of the mounting points 108. The method further includes positioning the lower end 204 of each of the support members 200 in contact with the ground surface (e.g., by reorienting the game blind 10 such that the upper surface 102 of the frame 100 is approximately parallel to the ground surface) and adjusting a position of each of the support members 200 relative to the frame 100 to level the upper surface 102 of the frame 100. Finally, the method includes mounting at least one blind element 600 to at least one of the mounting points 108 in the frame 100.

In an illustrative embodiment, the method may include using one of the support members 200 to better stabilize the game blind 10 on its side during assembly (e.g., coupling the support member 200 to the frame 100, to one of the mounting points 108, at a position proximate to the ground surface, thereby preventing the game blind 10 from tipping over).

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

Other embodiments are set forth in the following claims.

What is claimed is:

1. A game blind comprising:
   a frame having a plurality of mounting points disposed proximate to a perimeter of the frame;
   a through-hole opening disposed centrally in the frame, the through-hole opening configured to receive at least a user's feet;
   a blind element secured to one of the plurality of mounting points, wherein the blind element is configured to at least partially conceal the user positioned within the opening;
   a base plate coupled to the frame;
   a plurality of through-holes, each one of the plurality of through-holes disposed in the base plate and extending parallel to the frame; and
   a plurality of support members, each one of the plurality of support members coupled to the frame proximate to the perimeter of the frame,
   wherein:
      each one of the plurality of support members is height adjustable,
      a lower end of each one of the plurality of support members is configured to contact a ground surface,
      the frame is configured to be suspended above the ground surface by the plurality of support members, and
      the game blind is reconfigurable between an in-use position and a collapsed position, wherein in the in-use position at least one of the plurality of support members is substantially perpendicular to the frame, and wherein in the collapsed position the at least one support member is received within one of the through-holes.

2. The game blind of claim 1, wherein the frame has an upper surface and at least one of the plurality of support members is substantially perpendicular to the upper surface, and wherein at least one of the plurality of support members is oriented at an angle relative to the upper surface.

3. The game blind of claim 1, wherein one of the plurality of support members is disposed centrally on the perimeter of the frame proximate to a front portion of the frame, and wherein one of the plurality of support members is angled away from the opening.

4. The game blind of claim 1, at least one of the plurality of support members further comprising a ground interface member coupled to the lower end, wherein the ground interface member is configured to penetrate the ground surface.

5. The game blind of claim 1, further comprising a seat assembly having a seat and a seat support, the seat support having a seat end and a mounting end, wherein the seat is pivotably disposed on the seat end and the mounting end is configured to attach to the frame.

6. The game blind of claim 1, the game blind further comprising at least one of a helper rail, a seat assembly, and an accessory support system, wherein at least one of the plurality of support members is configured to secure at least one of the helper rail, the seat assembly, and the accessory support system to the frame in the collapsed position.

7. The game blind of claim 6, at least one of the helper rail, the seat assembly, and the accessory support system further comprising a locking member, wherein in the collapsed position the locking member is configured to secure at least one of the helper rail, the seat assembly, and the accessory support system in position relative to the frame.

8. The game blind of claim 7, the locking member further comprising a groove, wherein in the collapsed position a shaft of at least one of the plurality of support members is received within the groove.

9. A game blind comprising:
- a frame having a plurality of mounting points disposed proximate to a perimeter of the frame;
- a through-hole opening disposed centrally in the frame, the through-hole opening configured to receive at least a user's feet;
- a stabilizing leg having a connecting end and a free end, wherein the connecting end is mounted to the frame, the stabilizing leg further comprising a plurality of holders extending from the stabilizing leg disposed between the connecting end and the free end;
- a blind panel coupled to the stabilizing leg, wherein the blind panel further comprises a plurality of apertures, and wherein each one of the plurality of apertures is configured to receive a corresponding one of the plurality of holders;
- a blind element secured to one of the plurality of mounting points, wherein the blind element is configured to at least partially conceal the user positioned within the opening; and
- a plurality of support members, each one of the plurality of support members coupled to the frame proximate to the perimeter of the frame,
wherein:
- each one of the plurality of support members is height adjustable,
- a lower end of each one of the plurality of support members is configured to contact a ground surface, and
- the frame is configured to be suspended above the ground surface by the plurality of support members.

10. The game blind of claim 9, wherein one of a reflective material and an adhesive material is disposed on a surface of the blind panel.

11. The game blind of claim 1, further comprising a helper rail having a support post and a support rail that is substantially perpendicular to the support post, wherein the helper rail is configured to be attached to the frame, and wherein the support post is height adjustable.

12. The game blind of claim 11, the frame further comprising a plurality of helper rail mounting points proximate to a front portion of the frame, wherein the plurality of helper rail mounting points are aligned with one another and arranged along a reference line that extends from the front portion toward a rear portion of the frame, and wherein the helper rail is configured to be attached to any one of the plurality of helper rail mounting points.

13. A game blind comprising:
- a frame having a plurality of mounting points disposed proximate to a perimeter of the frame;
- a through-hole opening disposed centrally in the frame, the through-hole opening configured to receive at least a user's feet;
- a blind element secured to one of the plurality of mounting points, wherein the blind element is configured to at least partially conceal the user positioned within the opening;
- a base plate affixed to the frame, the base plate comprising a plurality of connection points oriented substantially parallel to the frame, wherein at least one of the plurality of connection points is configured to secure the blind element in position relative to the frame; and
- a plurality of support members, each one of the plurality of support members coupled to the frame proximate to the perimeter of the frame,
wherein:
- each one of the plurality of support members is height adjustable,
- a lower end of each one of the plurality of support members is configured to contact a ground surface, and
- the frame is configured to be suspended above the ground surface by the plurality of support members.

14. The game blind of claim 13, further comprising a helper rail having a support post and a support rail that is substantially perpendicular to the support post, the frame further comprising a stud, wherein in a collapsed position the support post is secured to one of the plurality of connection points and the support rail is secured to the stud.

15. A method of assembly for a game blind having a frame and through-hole opening disposed centrally in the frame, wherein the through-hole opening is configured to receive a user's feet, the game blind further comprising a base plate coupled to the frame and a plurality of through-holes, wherein each one of the plurality of through-holes is disposed in the base plate and extends parallel to an upper surface of the frame, the method of assembly comprising:
- positioning a lower end of each of a first support member, a second support member, and a third support member in contact with a ground surface by reconfiguring each of the first support member, the second support member, and the third support member from a collapsed position to an in-use position, wherein in the collapsed position each one of the first support member, the second support member, and the third support member is received within one of the plurality of through-holes, and wherein in the in-use position each one of the first support member, the second support member, and the third support member is substantially perpendicular to the upper surface, wherein each of the first support member, the second support member, and the third support member are coupled to the frame proximate to a perimeter of the frame;
- adjusting a position of each of the first support member, the second support member, and the third support member relative to the frame to level the frame; and
- mounting a blind element to at least one of a plurality of mounting points disposed on the perimeter of the frame, wherein the blind element is configured to at least partially conceal the user positioned in the opening.

* * * * *